US012296592B2

(12) United States Patent
Egawa et al.

(10) Patent No.: US 12,296,592 B2
(45) Date of Patent: May 13, 2025

(54) INKJET PRINTING APPARATUS, CONTROL METHOD, AND STORAGE MEDIUM

(71) Applicant: CANON KABUSHIKI KAISHA, Tokyo (JP)

(72) Inventors: Sonoko Egawa, Kanagawa (JP); Yoshiaki Murayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 245 days.

(21) Appl. No.: 18/058,072

(22) Filed: Nov. 22, 2022

(65) Prior Publication Data

US 2023/0166512 A1 Jun. 1, 2023

(30) Foreign Application Priority Data

Nov. 26, 2021 (JP) ................................. 2021-192444

(51) Int. Cl.
*B41J 2/165* (2006.01)

(52) U.S. Cl.
CPC ....... *B41J 2/16511* (2013.01); *B41J 2/16526* (2013.01); *B41J 2/16514* (2024.05)

(58) Field of Classification Search
None
See application file for complete search history.

(56) References Cited

U.S. PATENT DOCUMENTS

2016/0052276 A1* 2/2016 Tenkawa .................. B41J 29/02 347/7
2020/0406621 A1* 12/2020 Kobashi ............... B41J 2/16505

FOREIGN PATENT DOCUMENTS

JP 2007021984 A 2/2007
JP 2008221796 A * 9/2008

OTHER PUBLICATIONS

Yamada, MachineTranslationofJP-2008221796-A, 2008 (Year: 2008).*

* cited by examiner

*Primary Examiner* — Scott A Richmond
(74) *Attorney, Agent, or Firm* — Canon U.S.A., Inc. I.P. Division

(57) ABSTRACT

The amount of ink in a cap at the time of end of printing initiated by a print command is estimated, and it is determined whether an open suction action is to be performed based on the estimated post-printing ink amount to prevent spillover of the ink and reduce downtime due to the open suction action.

15 Claims, 21 Drawing Sheets

FIG. 10

| TYPE OF PRINT MEDIUM | COLOR/ MONOCHROME | PRINT QUALITY | NOZZLE LENGTH L_n USED FOR PRINTING BY NOZZLE ROW A | NUMBER OF PRINT PASSES AT NORMAL CONDITIONS | MAXIMUM NUMBER OF PRINT PASSES P_max |
|---|---|---|---|---|---|
| PRINT MEDIUM A | COLOR | FAST | 10.7 mm | 1 | 3 |
| | | STANDARD | 10.7 mm | 2 | 4 |
| | | HIGH | 10.7 mm | 3 | 6 |
| | MONOCHROME | FAST | 26.8 mm | 1 | 6 |
| | | STANDARD | 26.8 mm | 2 | 8 |
| | | HIGH | 26.8 mm | 3 | 9 |
| PRINT MEDIUM B | COLOR | FAST | 10.7 mm | 2 | 4 |
| | | STANDARD | 10.7 mm | 3 | 6 |
| | | HIGH | 10.7 mm | 5 | 10 |
| | MONOCHROME | FAST | 26.8 mm | 2 | 8 |
| | | STANDARD | 26.8 mm | 3 | 9 |
| | | HIGH | 26.8 mm | 5 | 10 |

FIG. 19

| PRIORITY | Bk | CL |
|---|---|---|
| HIGH | A | A |
| | B | B |
| | C | C |
| | D | D |
| LOW | E | E |

INKJET PRINTING APPARATUS, CONTROL METHOD, AND STORAGE MEDIUM

BACKGROUND

Field

The present disclosure relates to an inkjet printing apparatus, a control method, and a storage medium.

Description of the Related Art

Inkjet printing apparatuses that print an image by applying ink onto a print medium have been developed. In inkjet printing apparatuses, while an image is not being printed, water in ink may evaporate from nozzles (discharge ports) that discharge the ink and, thus, the ink may thicken, resulting in the defective discharge of the ink from the nozzles. To prevent defective discharge, so-called preliminary discharge is performed to discharge ink that has thickened in the nozzles toward a cap. To prevent spillover of the ink stored in the cap due to the preliminary discharge, a discharge operation to discharge the ink in the cap is required. The discharge operation is referred to as an open suction action. The open suction action takes a certain amount of time.

Japanese Patent Laid-Open No. 2007-21984 describes that it is determined whether an open suction action is performed before a printing operation on the basis of the size of a print medium. This configuration can eliminate an open suction action on the basis of the size of a print medium and reduce printing time required per sheet of a print medium.

SUMMARY

According to an aspect of the present disclosure, an inkjet printing apparatus includes a print head including a plurality of nozzles, each discharging ink, a conveyance unit configured to convey a print medium relative to the print head, a cap configured to receive the ink discharged from the print head during preliminary discharge, an acquisition unit configured to acquire a post-printing ink amount when a print command is input for a print medium, wherein the post-printing ink amount is the amount of ink in the cap at a time of end of printing that is initiated by the print command, and a discharge unit configured to perform a discharge operation to discharge the ink in the cap before start of the printing initiated by the print command if the post-printing ink amount acquired by the acquisition unit is greater than a threshold value.

Further features of the present disclosure will become apparent from the following description of exemplary embodiments with reference to the attached drawings.

BRIEF DESCRIPTION OF THE DRAWINGS

FIG. 10 illustrates a correspondence table between a print setting and a parameter used for calculation according to the first embodiment.

FIG. 19 illustrates a table indicating the priority of a cleaning flag according to the third embodiment.

DESCRIPTION OF THE EMBODIMENTS

First Embodiment

An exemplary embodiment of the present disclosure is described below with reference to the accompanying drawings.

Figure 1:
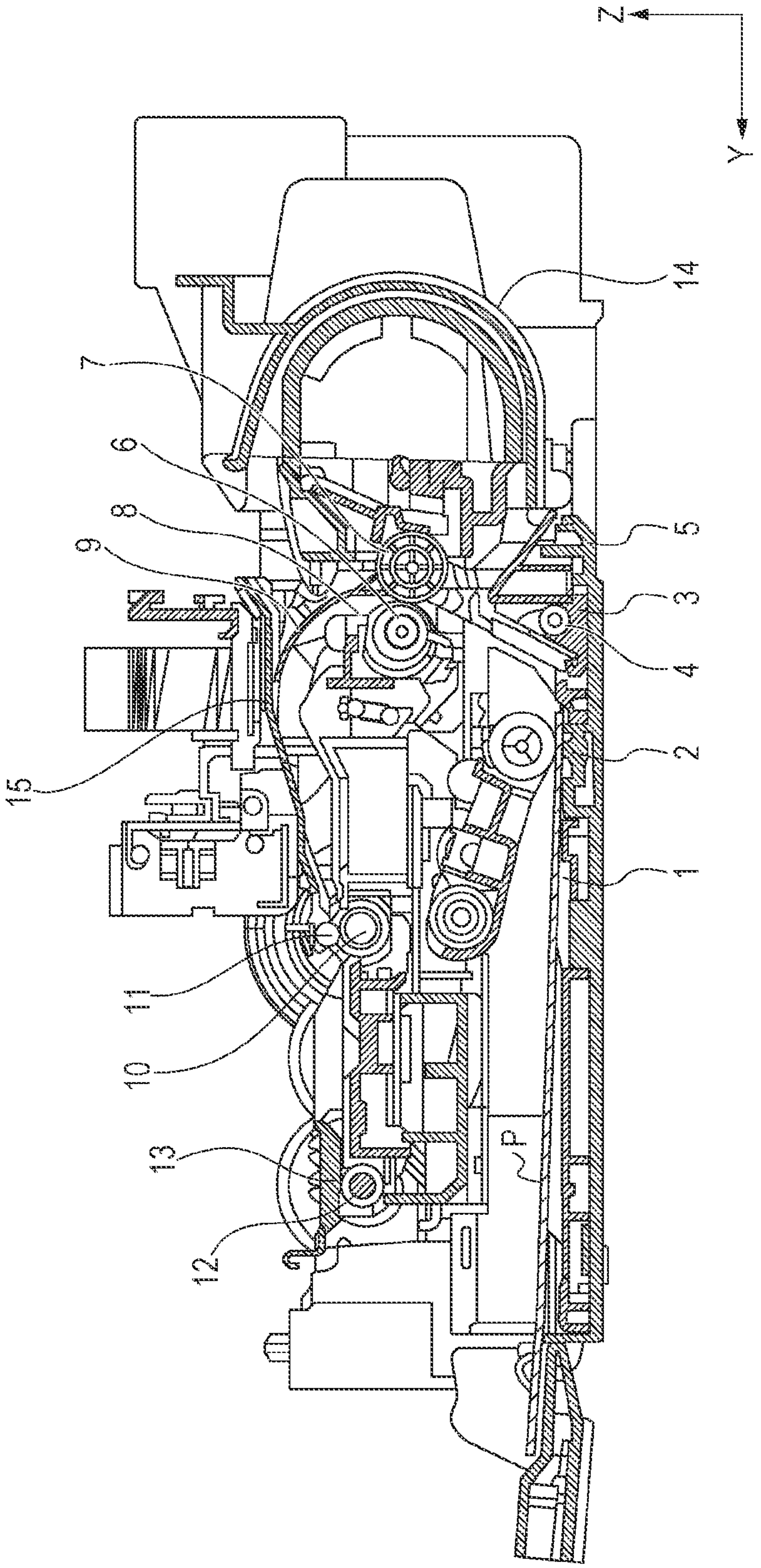
FIG. 1 is a cross-sectional view of an entire printing apparatus.
Figure 2:
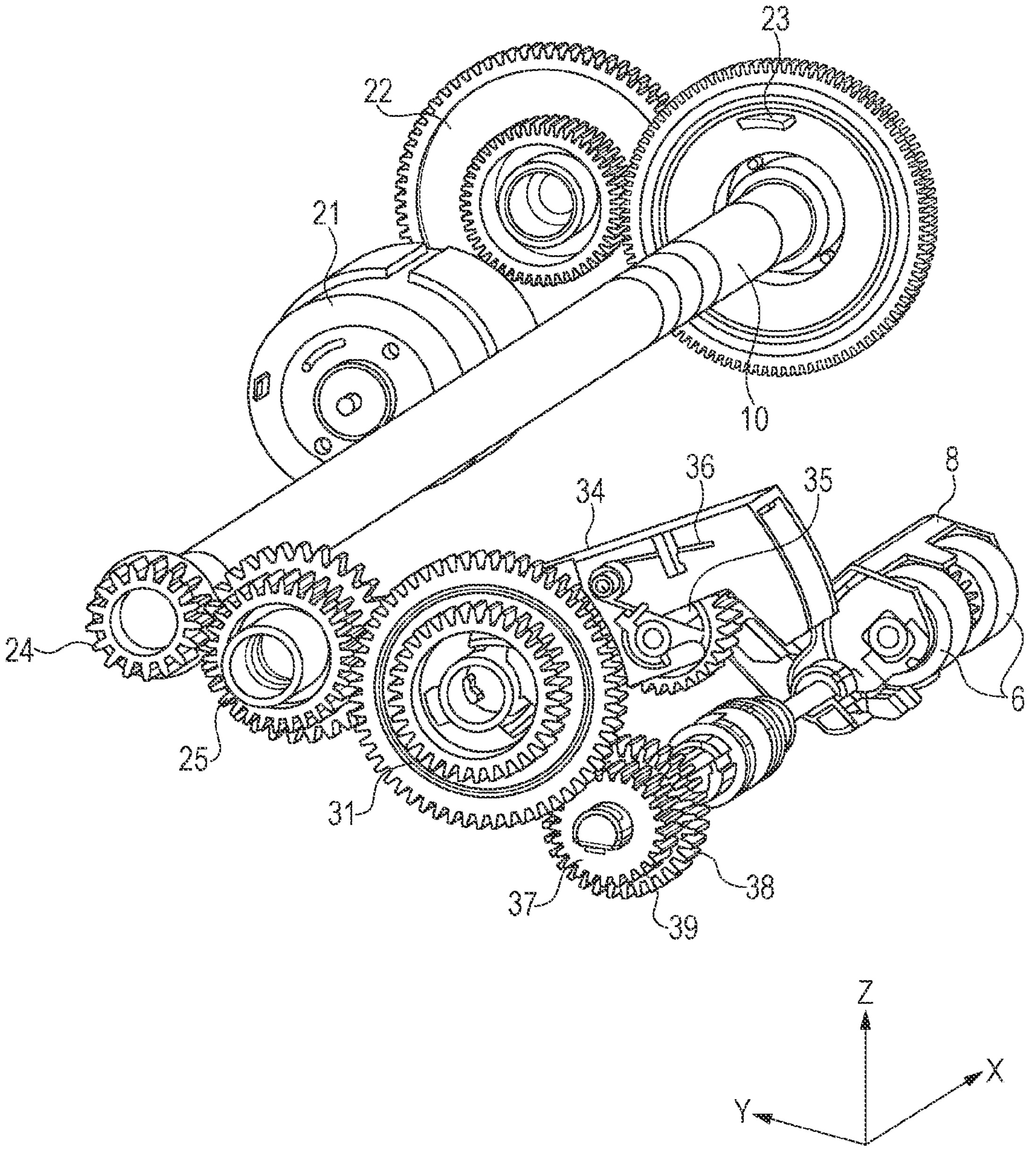
FIG. 2 is a perspective view of a drive mechanism of the printing apparatus.

FIG. 1 is a cross-sectional view of an entire inkjet printing apparatus according to the present embodiment. Upon receiving a print command sent from a host apparatus, such as a personal computer (PC), a control unit drives a motor 21 that serves as a drive source for each of mechanisms of the inkjet printing apparatus. The motor 21 is illustrated in FIG. 2 (described below). The motor 21 drives a paper supply mechanism 2, an intermediate roller 6, a conveyance roller 10 disposed downstream of the intermediate roller 6, and a sheet discharging roller 12 disposed downstream of the conveyance roller 10. The paper supply mechanism 2 conveys print media P stacked on the paper feed tray 1 so as to push out the print media P and brings the print media P into contact with a separating member 4, which separates the print media P one by one. The separated print medium P is conveyed by the paper supply mechanism 2 to the intermediate roller 6 and its paired pinch roller 7. When the leading edge of the print medium P moves past the intermediate roller 6, the leading edge collides with the circumference of a U-turn paper guide, and the conveyance direction is reversed while following the paper guide. Then, the leading edge reaches the conveyance roller 10 and its paired pinch roller 11. When the leading edge of the print medium P reaches a nip portion of the conveyance roller 10, the position of the leading edge is adjusted in accordance with the type of print medium, and the skew of the print medium is corrected. This leading edge position adjustment is also referred to as "leading edge registration". When the leading edge registration is performed, the conveyance roller 10 can be driven by the motor 21 so as to also rotate in a direction in which the print medium P is returned, that is, moved in the direction opposite to the conveyance direction. In contrast, the intermediate roller 6 is configured to always rotate in a forward conveyance direction, that is, in a direction in which the print medium P is discharged, regardless of the driving direction of the motor 21. This two-roller configuration can form a loop of the print medium in front of the conveyance roller 10. When the print medium P reaches the conveyance roller, the motor 21 reverses its driving direction so as to temporarily rotate the conveyance roller 10 in the direction in which the print medium is rewound. Thereafter, the conveyance roller 10 is rotated again in the forward direction to convey the print medium P in the direction in which the print medium P is discharged. In this manner, the leading edge registration is completed. After the leading edge registration is performed, the print medium P is conveyed onto a platen, and the paper feeding operation is completed.

Figure 6:
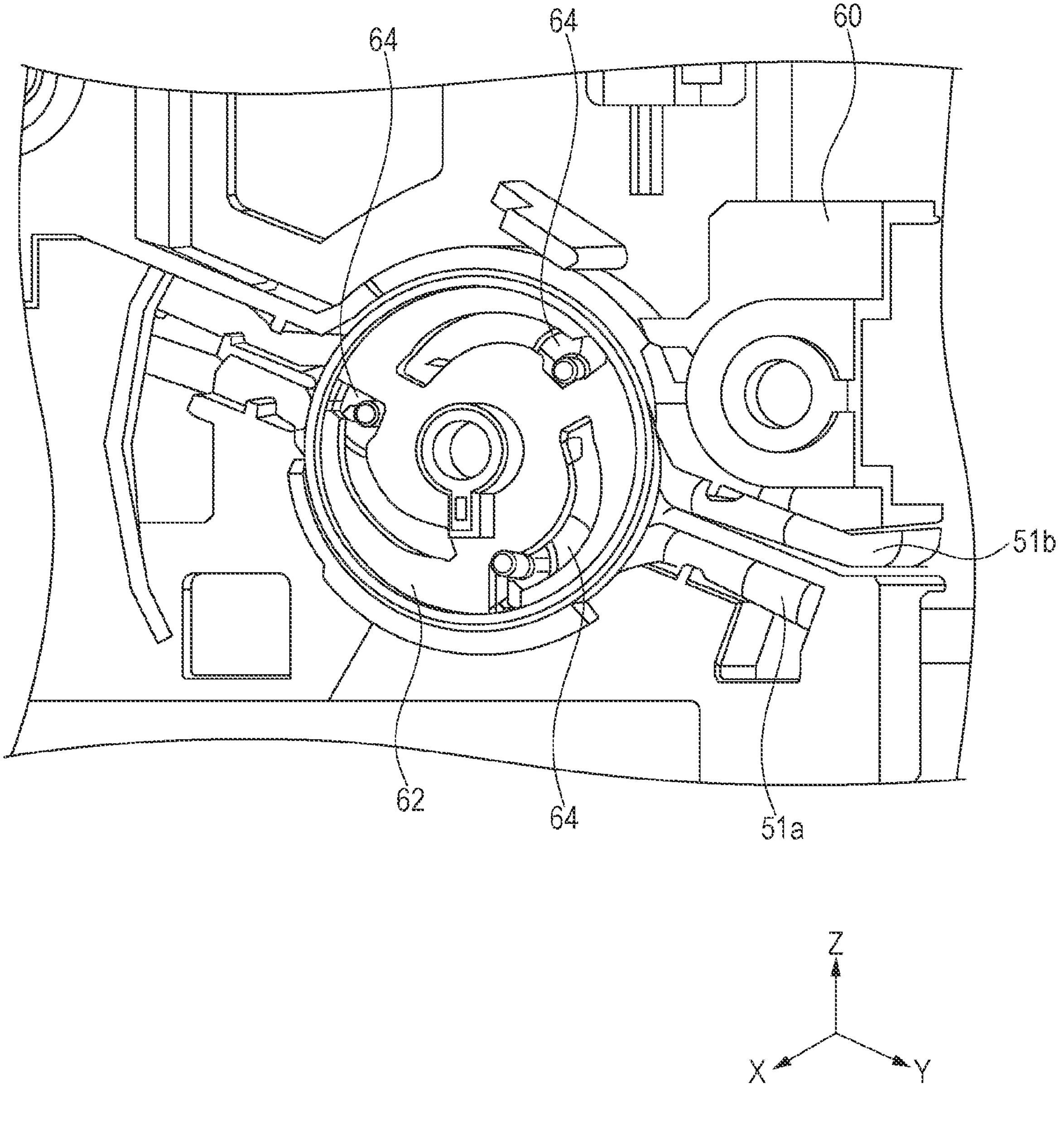
FIG. 6 is a perspective view of the pump mechanism.
Figure 7:
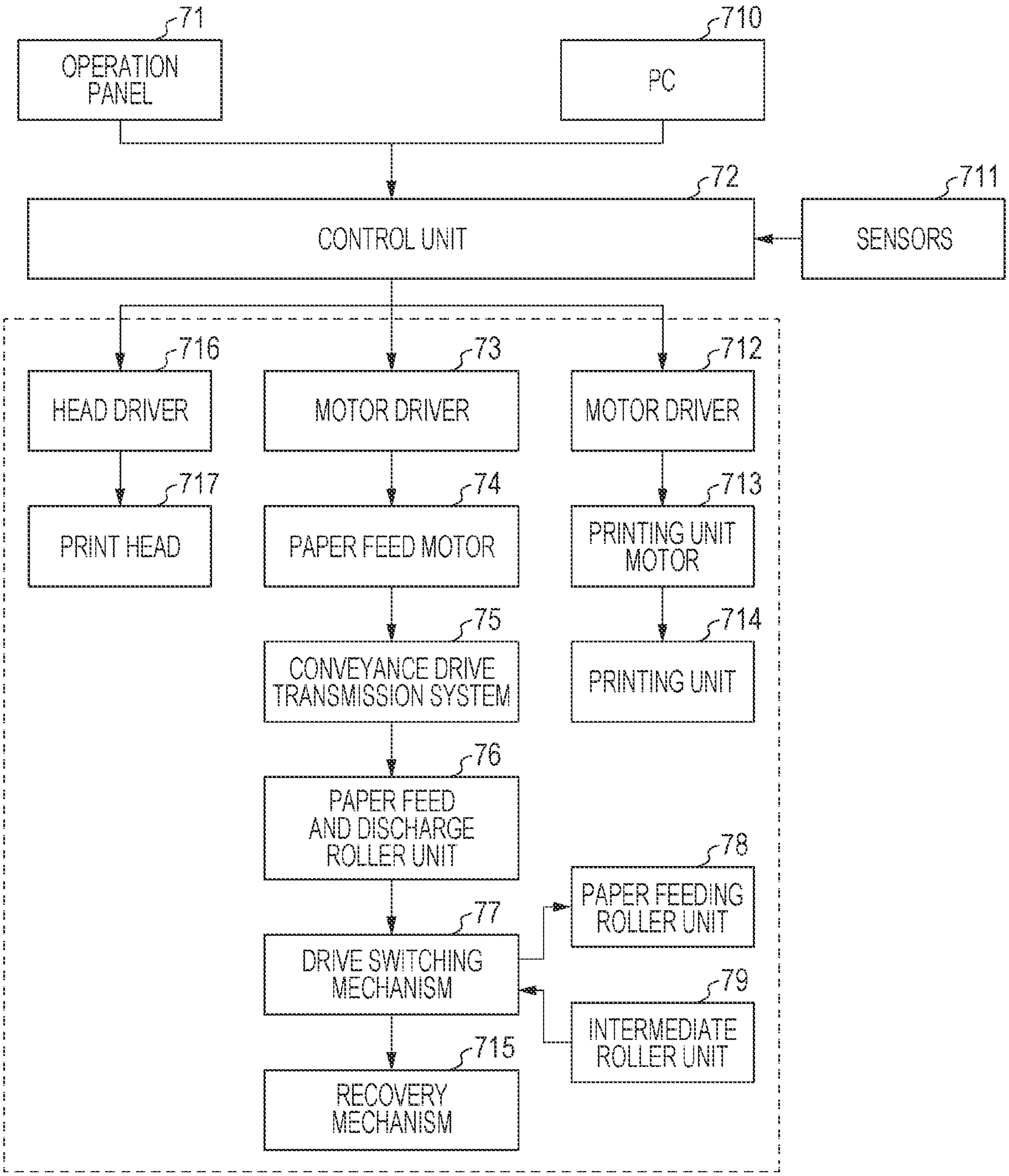
FIG. 7 is a block diagram of the outline of the control configuration of the printing apparatus.

A printing unit 714 that scans relative to the print medium P is disposed above the platen (see FIG. 7). The printing apparatus according to the present embodiment is a so-called serial type printing apparatus in which the printing unit 714 scans in a scanning direction (the X direction in FIGS. 1 to 6) that intersects the conveyance direction (the Y direction in FIGS. 1 to 6).

During the scan, ink droplets are discharged from the nozzles (the discharge ports) of the print head 717 mounted in a printing unit 714 onto the print medium P conveyed onto the platen, and an image is printed on the print medium P.

Figure 16A:
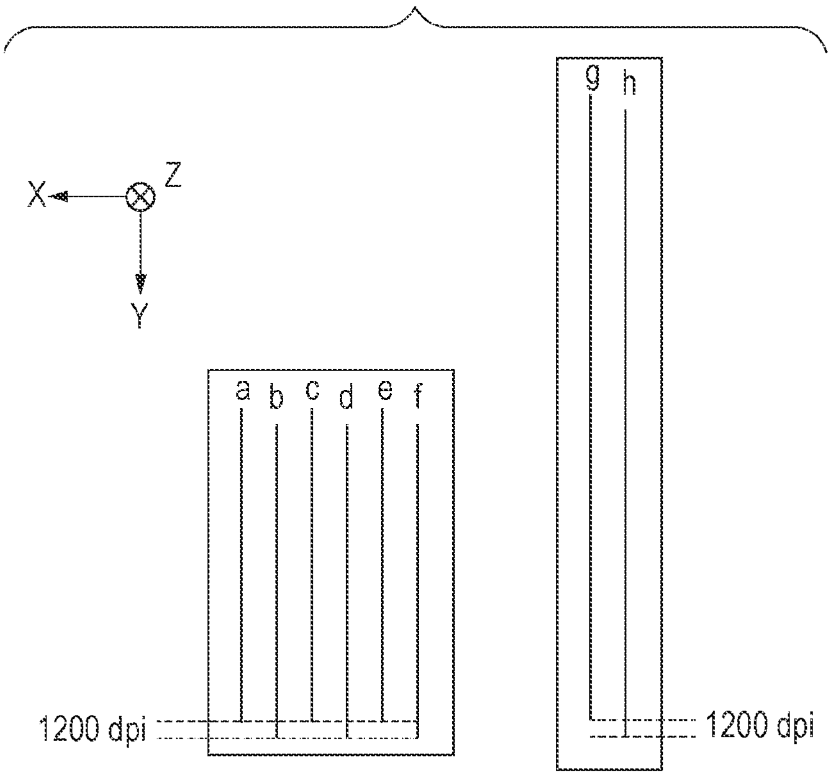
FIGS. 16A and 16B illustrate a print head.
Figure 16B:
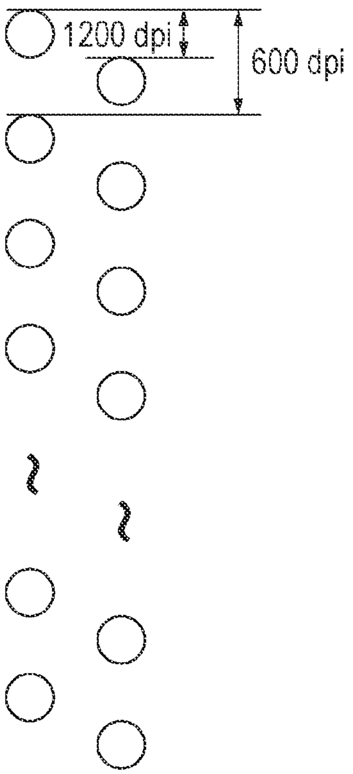

FIGS. 16A and 16B are schematic illustrations of the print head 717. FIG. 16A is a conceptual diagram of a nozzle surface (a discharge port surface) on which a nozzle array including a plurality of nozzles (discharge ports) for discharging ink is disposed. FIG. 16B illustrates the nozzle arrangement in each of nozzle rows. In each of the nozzle row, nozzles are arranged at intervals of 600 dpi in the Y direction in FIGS. 16A and 16B. Two nozzle rows for each ink color are arranged in a staggered pattern with a shift of 1200 dpi in the Y direction. That is, the printing resolution in the Y direction for each ink color is 1200 dpi.

The print head 717 includes an ink flow passage (not illustrated) for supplying ink to the nozzles. In addition, each of the nozzles includes a print element that generates energy for discharging ink in the form of droplets. According to the present embodiment, an electrothermal transducer element that converts electric energy into heat energy is used as the print element. However, the print element is not limited thereto, and may be a piezo element.

In FIG. 16A, rows a and b are nozzle rows arranged to discharge cyan ink, rows c and d are nozzle rows arranged to discharge magenta ink, and rows e and f are nozzle rows arranged to discharge yellow ink. Similarly, rows g and h are nozzle rows to discharge black ink. Each of the nozzle rows for cyan, magenta, or yellow color ink has 256 nozzles arranged therein, and the nozzle row for black ink has 640 nozzles arranged therein.

A printing operation to print an image is performed by repeating the conveyance by the conveyance roller 10 and the print scan by the printing unit 714 described above. According to the present embodiment, a method known as multipass printing method is employed in which a plurality of scans are performed on a unit area of the print medium to complete printing of an image on the unit area. A print scan by the printing unit 714 is also referred to as a "pass", and the number of times the print head 717 scans to complete printing on a predetermined unit area is referred to as the "number of passes". When the printing of an image is completed, the print medium P is conveyed in the forward conveyance direction by a pair consisting of the sheet discharging roller 12 and a spur 13 and is discharged.

FIG. 2 is a perspective view of a drive mechanism of the inkjet printing apparatus according to the present embodiment. More specifically, FIG. 2 illustrates the details of a drive transmission mechanism that transmits the drive force of the motor 21 to the conveyance roller 10 and the intermediate roller 6. According to the present embodiment, both the conveyance roller 10 and the intermediate roller 6 are commonly driven by the motor 21. This enables reduction in the size and cost of the printing apparatus body.

A gear (not illustrated) attached to the rotating shaft of the motor is connected via an idler gear 22 to a conveyance input gear 23 attached to one end of a shaft of the conveyance roller 10. A code wheel (not illustrated) with markings is attached to the conveyance input gear 23, and the rotation amount of the motor can be detected. By reading the code wheel with an encoder sensor (not illustrated), the rotation amount of the conveyance roller 10 can be controlled. A conveyance output gear 24 is attached to the other end of the shaft of the conveyance roller 10. The drive force is transmitted from the conveyance output gear 24 to a sun gear 31 via an idler gear 25.

The sun gear 31 is configured as a clutch gear.

Figure 3:
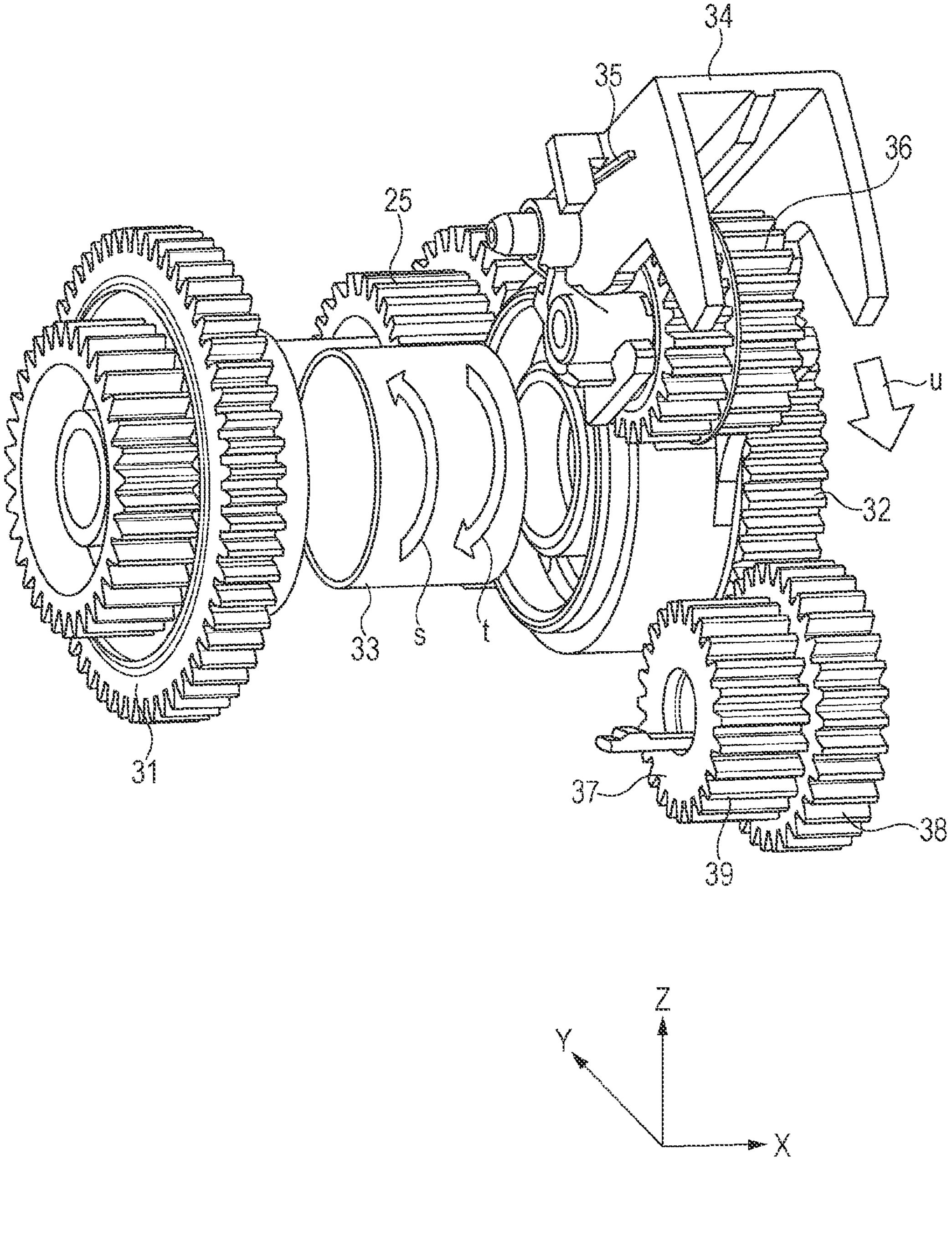
FIG. 3 is a perspective view of a clutch gear.

FIG. 3 is a perspective view of the configuration of the clutch gear illustrated in FIG. 2. As illustrated in FIG. 3, a spring 33 is provided inside the sun gear 31, and the forward rotation of the sun gear 31 tightens the spring 33, enabling the sun gears 31 and 32 to rotate together. In contrast, the reverse rotation of the sun gear 31 opens the spring 33. Therefore, when a load is applied to the sun gear 32, the sun gear 31 and the sun gear 32 slip from each other and cannot rotate together. A swing arm 34 is provided on the shaft of the sun gear 31, and a planet gear 35 is attached onto a swing arm 34. A swing arm spring 36 is provided between the planet gear 35 and the swing arm 34 so that when the sun gear 31 rotates, the swing arm 34 also rotates together due to friction. A step 38 of a multi-step gear 37 is meshed with the sun gear 32. In addition, a step 39 of the multi-step gear 37 is attached at a position where the step 39 can be meshed with the planet gear 35.

Due to the configuration, when the sun gear 31 rotates in the forward direction (the direction of arrow s), the drive force input to the sun gear 31 is transmitted to the step 38 of the multi-step gear 37 by the sun gear 32 that rotates together with the sun gear 31. In contrast, when the sun gear 31 rotates in the reverse direction (the direction of arrow t), the swing arm 34 moves in the direction of arrow u in FIG. 3, the planet gear 35 and the step 39 of the multi-step gear 37 are meshed, and the drive force is transmitted to the multi-step gear 37. Since the sun gear 32 is a clutch gear, the sun gear easily slips during reverse rotation and does not interfere with driving. Due to the transmission method, the direction of rotation of the multi-step gear 37 is the same regardless of whether the sun gear 31 rotates in the forward or reverse direction.

Figure 4:
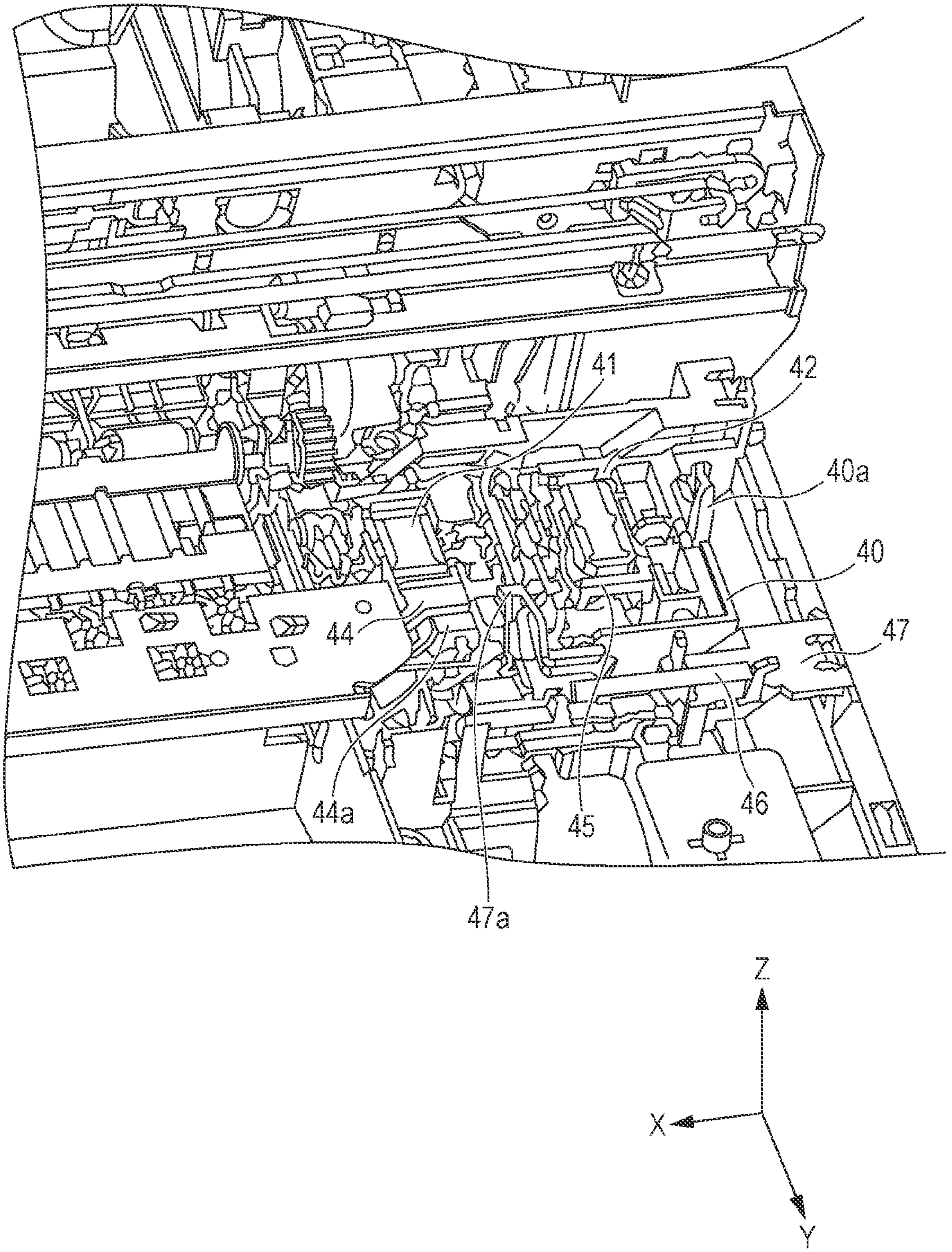
FIG. 4 is a perspective view of a recovery mechanism.

FIG. 4 is a perspective view of a recovery mechanism 715. The recovery mechanism of the present embodiment is used to ensure the ink discharge performance of the print head 717. In FIG. 4, a slider 40 follows the movement of the print head 717 in the reciprocating direction and can slide in an area outside the print area in which the image is printed. In addition, the slider 40 is movable in a direction perpendicular to the color ink nozzle surface and the black ink nozzle surface of the print head 717, that is, in the direction in which the ink is discharged. Such movement of the slider 40 enables the caps 41 and 42 to move closer to (contact) the nozzle surface of the print head 717 and away from (separate from) the nozzle surface.

The cap 41 is used for cyan, magenta, and yellow color ink, and the cap 42 is used for black ink. A cap holder 44 and a cap holder 45 are mounted on the slider 40. In addition, in an area that differs from the print area, the slider 40 is movable in accordance with the movement of the print head 717 in the direction in which the printing unit 714 moves and in directions in which the print head 717 and the cap for each of black and color move closer to and away from each other. The caps 41 and 42 have pump tubes 51*a* and 51*b* connected thereto, respectively, and the pump tubes 51*a* and 51*b* are connected to a pump mechanism including a suction pump that generates negative pressure. By driving the suction pump, a recovery operation can be performed to suck ink from each of the nozzles via the cap.

Figure 5:
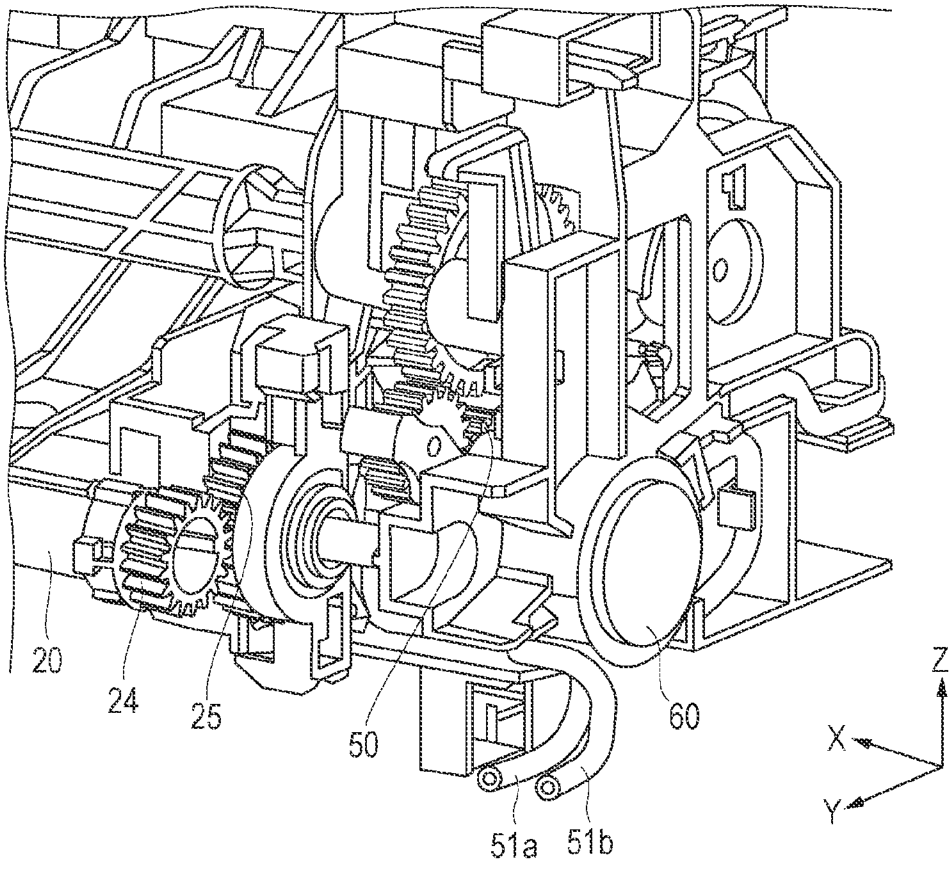
FIG. 5 is a perspective view of a drive transfer construction from a conveyance roller to a pump mechanism.

FIG. 5 is a perspective view of the drive transfer construction from the conveyance roller 10 to the pump mechanism, and FIG. 6 is a perspective view of the pump mechanism. Pump rollers 64 are attached to a pump roller holder 62. The pump tubes 51*a* and 51*b* extend along one-half the circumference of the inner wall of a pump base 60 and are rotatably inserted into the pump base 60. When the conveyance roller 10 is reversed due to the drive force of the motor 21 with the print head 717 capped, the drive force is transmitted to the pump roller holder 62 via the conveyance output gear 24, the idler gear 25, and a pump drive gear 50. The pump rollers 64 move cams provided in the pump roller holder 62, so that the inner wall of the pump base 60 and the pump rollers 64 compress the pump tubes 51*a* and 51*b*. When the reverse driving of the conveyance roller 10 is continued, a negative pressure is generated inside the pump tubes 51*a* and 51*b*.

When the nozzle surface of the print head 717 is capped by the caps 41 and 42 and a negative pressure is generated, ink can be sucked from the nozzles of the print head 717 via the caps 41 and 42. When the nozzle surface of the print head 717 is not capped and a negative pressure is generated, a discharge operation (an open suction action) can be performed for sucking and discharging ink accumulated in the cap due to preliminary discharge or the like. In addition, if, in the open suction action, the pump tubes 51*a* and 52*b* are individually compressed, ink suction from the nozzles or an open suction action in the cap can be performed on the caps 41 and 42 individually.

When the negative pressure inside the pump tube is released after the suction operation to suck ink is completed, the pump roller holder 62 is driven to rotate in the opposite direction. That is, the conveyance roller 10 is rotationally driven in the forward direction. By uncompressing the pump tubes 51*a* and 51*b* that are compressed by the pump rollers 64, the negative pressure inside the pump tubes is released. As described above, the pump tubes are driven by the motor 21, which drives both the conveyance roller 10 and the intermediate roller 6, and the motor 21 is driven in the direction of reversing the conveyance roller 10. As a result, negative pressure is generated in the pump tubes. In this manner, the printing apparatus of the present embodiment performs the suction operation by reversing the conveyance roller 10 and generating negative pressure in the caps. For this reason, when a print medium is nipped by the conveyance roller 10, negative pressure cannot be generated in the caps without moving the print medium in the Y direction. Therefore, to perform a capping operation to bring the print head 717 into tight contact with the caps 41 or 42 or an open suction operation to discharge ink in the cap, nipping of the print medium by the conveyance roller needs to be released.

FIG. 7 is a block diagram of the outline of the control configuration according to the present embodiment. A control unit 72 includes a central processing unit (CPU), a read only memory (ROM), and a random access memory (RAM). The CPU, which includes one or more processors, circuitry, or combinations thereof, performs various processing in accordance with programs stored in memories, such as the ROM, the RAM, or the like. The RAM is a volatile storage that temporarily stores programs and data. The ROM is a nonvolatile storage that stores table data and programs used in each of the processes (described below). The control unit 72 outputs a motor current control signal to each of motor drivers 73 and 712 in accordance with an input from an operation panel 71 or a connected PC 710. Thus, the control unit 72 controls the operations described below. That is, a paper feed motor 74, which corresponds to the motor 21 for driving, for example, the above-described conveyance roller 10, drives a paper feed and discharge roller unit 76 via a conveyance drive transmission system 75 and a drive switching mechanism 77 in response to a signal input from the motor driver 73. In addition, a paper feeding roller unit 78 and an intermediate roller unit 79, which respectively correspond to the above-described conveyance roller 10 and intermediate roller 6, are similarly driven. The paper feed motor 74 drives the above-described pump tubes of the recovery mechanism.

A printing unit motor 713 drives the printing unit 714 in response to a signal input from the motor driver 712. A variety of sensors 711 provided in a paper conveyance unit and the printing unit 714 detect the position of the print medium P, the number of rotations of the conveyance roller 10, the printing position of the printing unit 714, and the like. The detected signals are input to the control unit 72, which outputs appropriate control signals to the motor drivers 73 and 712.

The control unit 72 outputs print data to a head driver 716 to drive the print head 717. The print data includes preliminary discharge data to ensure the discharge performance of the print head 717, as well as the image to be printed. According to the present embodiment, a preliminary discharge operation includes the following three types, that is, pre-printing preliminary discharge performed before a printing operation to print an image on a print medium, intra-printing preliminary discharge performed during the printing operation, and intra-standby preliminary discharge performed in preparation for input of a subsequent print command. The preliminary discharge is performed to discharge ink that has thickened in the vicinity of the nozzles. According to the present embodiment, the ink is discharged into the caps. Preliminary discharge of color ink is performed into the cap 41, and preliminary discharge of black ink is performed into the cap 42.

Figure 8:
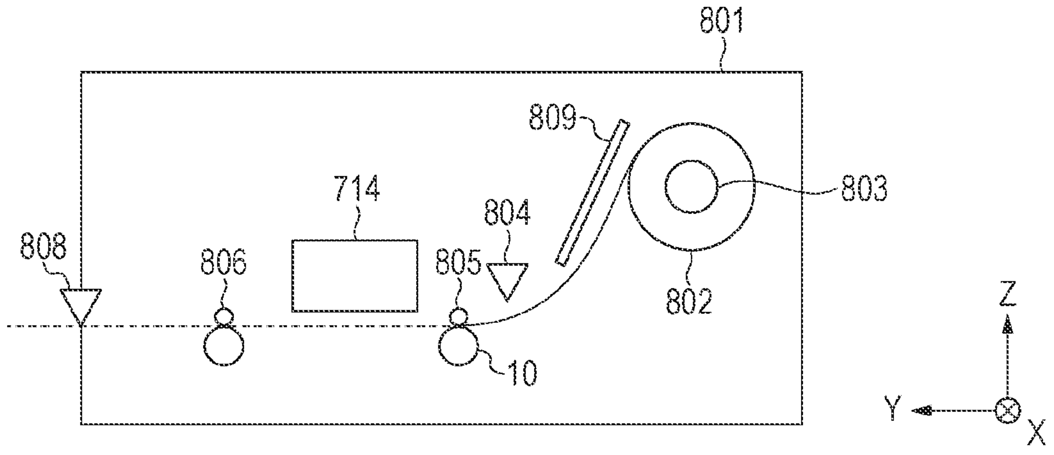
FIG. 8 is a vertical sectional view of the entire printing apparatus according to a first embodiment.

FIG. 8 is a cross-sectional view of an inkjet printing apparatus 801 according to the present exemplary embodiment. Roll paper 802, which is a print medium P, has a width of 24 inches in FIG. 8. The roll paper 802 is set in a roll paper holder 803. A sensor 804 detects the presence or absence of a print medium, and a pinch roller 805 is disposed to face the conveyance roller 10 and nips the roll paper. A conveyance roller 806 is disposed downstream in the conveyance direction. A cutter 808 cuts the roll paper after printing is finished. FIG. 8 illustrates the roll paper 802 that is nipped by the pinch roller 805. A cut sheet tray 809 is used to set cut sheets.

Figure 9:
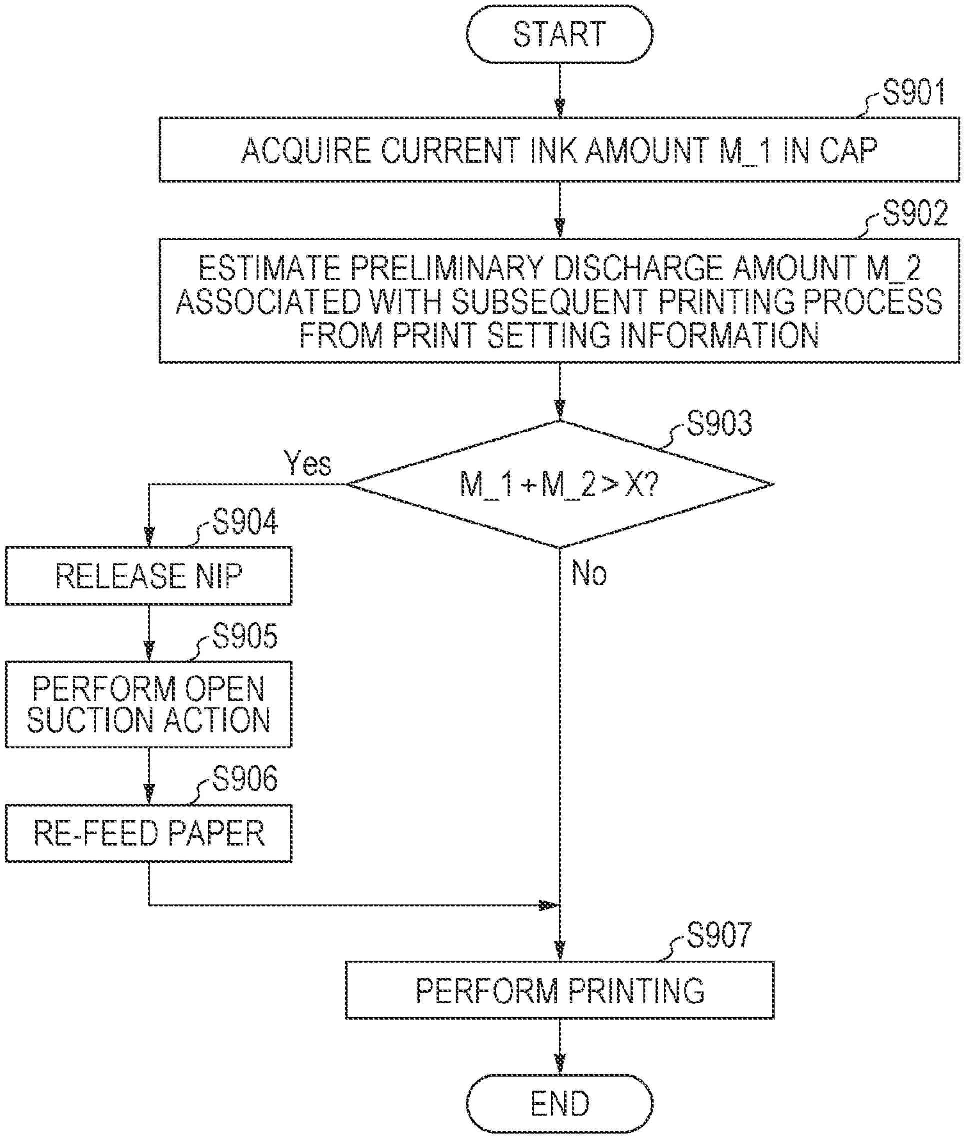
FIG. 9 is a flowchart of the control performed by the printing apparatus according to the first embodiment.

FIG. 9 is a flowchart of a process for determining whether to perform an open suction action according to the present embodiment. This process is started after a print command is received and the paper feeding operation is finished. The process is performed separately for each of the cap 41 corresponding to color ink and the cap 42 corresponding to black ink. It is assumed that the preliminary discharge of the present embodiment is performed into the caps 41 and 42.

In step S901, an ink amount M_1 in each of the caps at a current time is first acquired. Subsequently, in step S902, information set by the user (for example, the print quality, print medium type, image size, cut mode, drying time setting, number of pages, and margin amount) is acquired from the received print command. Then, based on the acquired information, a preliminary discharge amount M_2, which is the amount of preliminary discharge performed before printing of an image based on the received print command is finished, is calculated. A method for calculating the preliminary discharge amount M_2 is described in detail below.

In step S903, the current ink amount M_1 in the cap and the preliminary discharge amount M_2 due to preliminary discharge performed from this time, which are respectively obtained in steps S901 and S902, are summed. The result of the summation corresponds to the amount of ink in the cap at the time printing finishes. Thereafter, the result of the summation is compared with a threshold value X to determine whether the result of the summation is greater than the threshold value X. Herein, the threshold value X is less than the cap capacity. If the result of the summation is greater than the threshold value X, it is likely that spillover of the ink from the cap occurs by the time the printing finishes, so the ink currently accumulated in the cap needs to be discharged.

Therefore, if the result of the summation is greater than the threshold value X, the processing proceeds to step S904, where the conveyance roller 10 is reversed to rewind the roll paper 802 to a position where the leading edge of the roll paper 802 moves past the sensor 804. Then, nipping of the roll paper 802 by the pinch roller 805 is released. According to the present embodiment, since reverse rotation of the conveyance roller 10 generates negative pressure in the caps, the nip of the roll paper 802 needs to be released when the nozzle surface is capped, or an open suction action is performed. In step S905, the conveyance roller 10 is reversed with the cap separated from the nozzle surface of the print head 717, and an open suction action is performed. As a result, the ink in the cap is discharged. After the open suction action is finished, the roll paper 802 is fed again and nipped again in step S906. Thereafter, in step S907, an image printing operation is performed based on the print command. After the printing is finished, the processing is completed.

However, if in step S903, it is determined that the result of the summation is not greater than the threshold value X, the above-described open suction action is not performed, and the processing proceeds to step S907, where the printing operation is performed.

A method for estimating the preliminary discharge amount M_2 of ink to be discharged into the cap by the end of the printing operation associated with the print command in step S902 is described below. According to the present embodiment, there are roughly three timings for preliminary discharge. First one is pre-printing preliminary discharge that is performed before the paper feeding operation of a print medium is finished. Second one is intra-printing preliminary discharge that is performed after the printing operation is started and one scan of the print head 717 is finished and before the next scan is started. Third one is intra-standby preliminary discharge that is performed in preparation for reception of the next print command after the printing operation is finished.

The preliminary discharge amount M_2 is calculated as follows:

$$M\_2=M\_A+M\_B+M\_C \qquad \text{(Equation 1).}$$

M_2 is the total preliminary discharge amount due to preliminary discharge performed in the printing operation associated with the print command, M_A is the pre-printing preliminary discharge amount, M_B is the intra-standby preliminary discharge amount, and M_C is the intra-printing preliminary discharge amount. According to the present embodiment, M_2 is calculated for each of the caps 41 and 42. Each of the preliminary discharge amounts is calculated as follows:

$$M\_A=v\times n\times d\_a \qquad \text{(Equation 2),}$$

$$M\_B=T\_b/t\times v\times n\times d\_b \qquad \text{(Equation 3), and}$$

$$M\_C=(1/1\_n/P\_\max+(P\_\max-1))/2\times v\times n\times d\_c \qquad \text{(Equation 4).}$$

v is the discharge amount per ink droplet, and n is the number of nozzles per cap. d_a is the number of droplets discharged from one nozzle during pre-printing preliminary discharge, d_b is the number of droplets discharged from one nozzle during intra-standby preliminary discharge, and d_c is the number of droplets discharged from one nozzle during intra-printing preliminary discharge. T_b is the total standby time. t is the time interval between preliminary discharge operations during standby, and 1 is the length of the image. 1_n is the nozzle length, which is a value indicating the length in the conveyance direction of the nozzle array used for printing associated with a print command.

P_max is the number of passes and, in this case, is the value when the number of print passes is maximized. In the inkjet printing apparatus according to the present embodiment, control, such as power monitor control or leading edge control, is performed to increase the number of scans for a predetermined unit area under predetermined conditions. The power monitor control is control to increase the number of scans so that the number of ink droplets discharged per scan is less than or equal to a threshold value to prevent the power from exceeding the suppliable power. The leading edge control is a control to prevent the leading edge of the roll paper 802 from lifting and coming into contact with the nozzle surface in an area until the leading edge of the roll paper 802 moves past the sheet discharging roller 12 to prevent degradation of the image quality. By applying the leading edge control, the number of nozzles to be used and the positions of nozzles to be used can be optimized so that the amount of print medium lift and fluctuation in the amount of print medium lift between scans are reduced. It is difficult to determine whether to perform these controls for all scans before starting the printing operation. The determination process complicates the processing and causes downtime. For this reason, it is assumed that these controls are always applied, and the controls are reflected in Equation 4 as P_max.

According to the present embodiment, the values of v, n, d_a, d_b, d_c, and t are preset fixed values. According to the present embodiment, v=6.2 (ng), n=1536, d_a=8, d_b=8, d_c=2, and t=1.6 (s) for the cap 41, and v=13.5 (ng), n=1280, d_a=100, d_b=13, d_c=3, and t=1.6 (s) for the cap 42.

T_b is the sum of the inter-page delay time and the standby time over the cap in a cut mode selected by a user. The term "inter-page delay" refers to standby time until the roll paper 802 is cut by the cutter 808 after the end of printing. When a printed subject drops into, for example, a basket (not illustrated) immediately after the roll paper 802 is cut, the area where an image is printed may be rubbed and part of image may disappear, resulting in an image defect. In particular, an image defect easily occurs with a print medium onto which ink is difficult to fix, such as a film. To prevent the occurrence of such an image defect of the printed subject, a wait time is provided between the end of printing and the cutting to improve the fixability of the ink. A user can set the inter-page delay time to any value by using the host apparatus or the operation panel 71.

In addition, the user can select an auto cut mode or an eject cut mode as the cut mode. In the auto cut mode, the roll paper 802 is automatically cut when the specified inter-page delay time elapses since end of printing. The cut-operation associated standby time of the print head over the cap is less than or equal to the intermittent time of the intra-printing preliminary discharge. In the eject cut mode, the user can determine the time at which the cutter 808 cuts the roll paper 802 after end of printing, and the user instructs the printing apparatus to perform a cutting operation at the desired time by using the host apparatus or the UI of the printing apparatus.

According to the present embodiment, 300 seconds are set as the maximum time that the print head 717 can stand by over the cap with the roller nipping the print medium after end of printing of an image. During this period, the print head 717 stands by without contacting the cap. After 300 seconds have elapsed, the print medium is automatically cut. During standby, intra-standby preliminary discharge is performed at regular time intervals. Therefore, the amount of ink in the cap increases due to the intra-standby preliminary discharge. To prevent spillover of ink from the cap, the standby time needs to be limited to 300 seconds. For this reason, when the user selects the eject cut mode, the maximum standby time (300 seconds according to the present embodiment) is reflected in the value T_b. In addition, for the value 1, the length of data received as a print signal is reflected in the calculation.

FIG. 10 is a table of correspondence between print settings made by the user and values used for calculation of each of the preliminary discharge amounts. Since 1_n and P_max vary in accordance with the type of print medium, the print mode, and the print quality set by the user, 1_n and P_max are converted into values used in the calculus equations on the basis of the correspondence table between the values and user settings illustrated in FIG. 10.

As described above, the preliminary discharge amount due to preliminary discharge to be performed before the end of printing is estimated in response to input of the print command. Then, based on the estimation result, it is determined whether an open suction action for discharging the ink in the cap needs to be performed before starting printing. Such a configuration enables highly accurate determination of whether the open suction action is to be performed before start of printing.

When, as in, in particular, the configuration of the printing apparatus according to the present embodiment, the roll paper nip release and re-feeding operation are required along with the execution of the open suction action, the downtime due to the execution of the open suction action increases. Therefore, it is necessary to determine the necessity of the open suction action with high accuracy.

In addition, according to the present embodiment, the values used for calculation as fixed values may be variable in accordance with the use environment and the print settings. For example, according to the present embodiment, the ink discharge amount v is set based on the maximum discharge amount. However, the ink discharge amount v may be varied in accordance with the use environment or the rank of the print head 717. By using an ideal value for an environment closer to the actual environment in the calculation, the determination of the necessity of the open suction action can be made with higher accuracy.

Second Embodiment

The second embodiment of the present disclosure is described below. The conveyance drive transmission system and the configuration of the recovery mechanism according to the present embodiment are the same as those according to the first embodiment.

Figure 11:
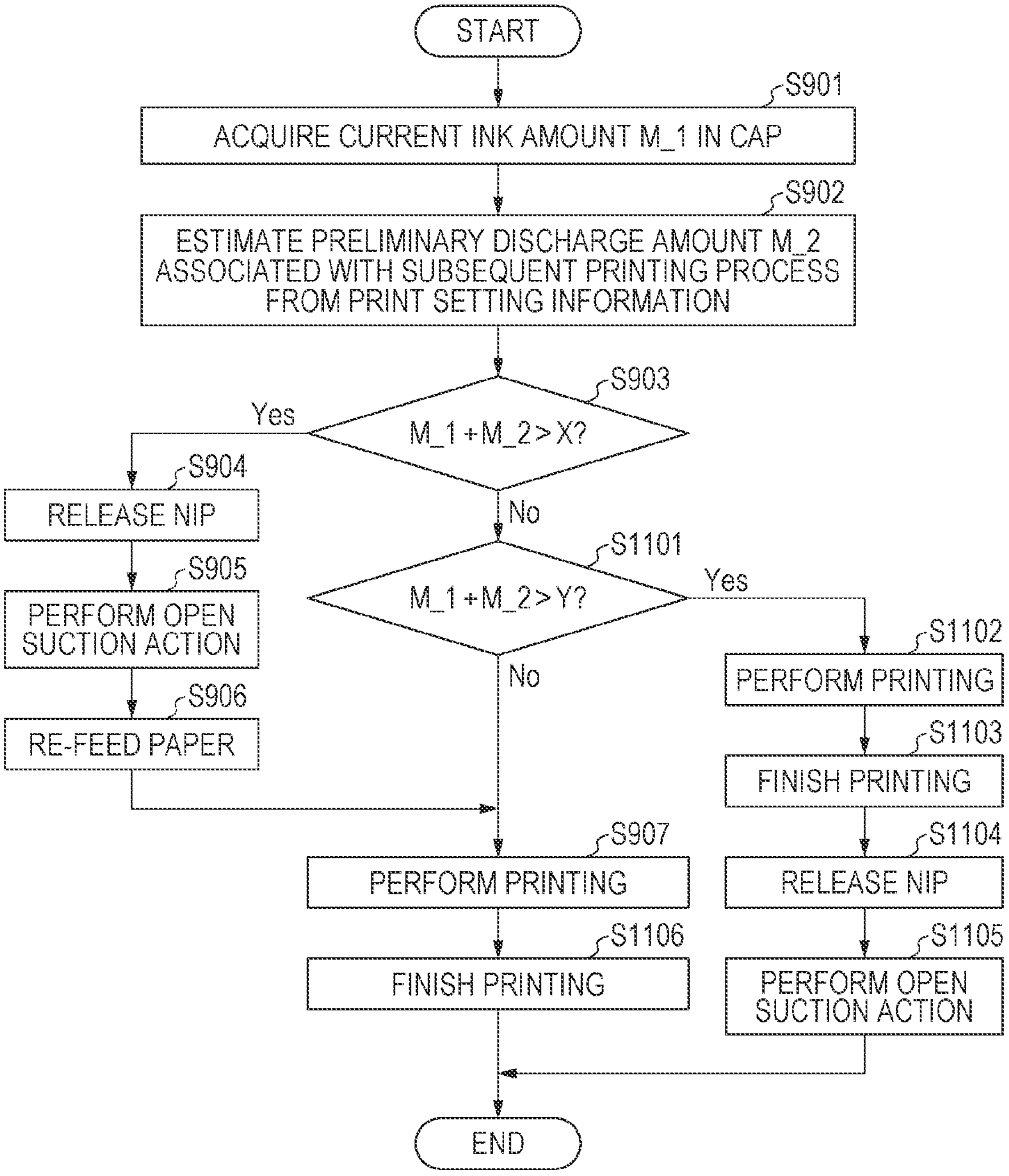
FIG. 11 is a flowchart of the control performed by a printing apparatus according to a second embodiment.

FIG. 11 is a flowchart of the printing operation according to the present embodiment. The processing of the flowchart starts when a print command is received and the paper feeding operation is finished. The processing related to the printing operation according to the present embodiment is basically the same as that in FIG. 9. However, if, in step S903 for determining the necessity of an open suction action before printing, it is determined that M_1+M_2 is not greater than X, the processing proceeds to step S1101, where M_1+M_2 is compared with a threshold value Y to determine whether to perform an open suction action after printing. If M_1+M_2 is greater than the threshold value Y, the printing operation is performed in step S1102. In step S1103, the printing operation is finished. In step S1104, the print medium is rewound to a predetermined position and, thereafter, the nipping by the pinch roller is released. Thus, an open suction action can be performed. In step S1105, an open suction action is performed, and the processing is completed. If, in step S1101, it is determined that M_1+M_2 is not greater than the threshold value Y, the printing operation is performed in step S907. In step S1106, the printing operation is finished. At this time, the relationship between the threshold value X and the threshold value Y is Y<X<cap capacity. The threshold value Y can be, for example, a value obtained by subtracting, from the threshold value X, the preliminary discharge amounts in the cap during pre-printing, intra-printing, and intra-standby preliminary discharges for a printing mode, the print quality, and the type of print medium frequently selected by the user. If the threshold value Y is set to an extremely small value, the frequency of the open suction action after the end of printing increases and, thus, the usability for the user may deteriorate, and the load imposed on the drive mechanism may increase if the next print command is submitted continuously. For this reason, it is desirable that the threshold value Y be set to an appropriate value from the above-described point of view.

As described above, the threshold value Y is additionally set, and the case is added in which the open suction action is performed after the printing operation is finished. This process eliminates the need to perform again the nipping operation for feeding a print medium when the next print command is received. As a result, downtime is further reduced as compared with the first embodiment.

Figure 12:
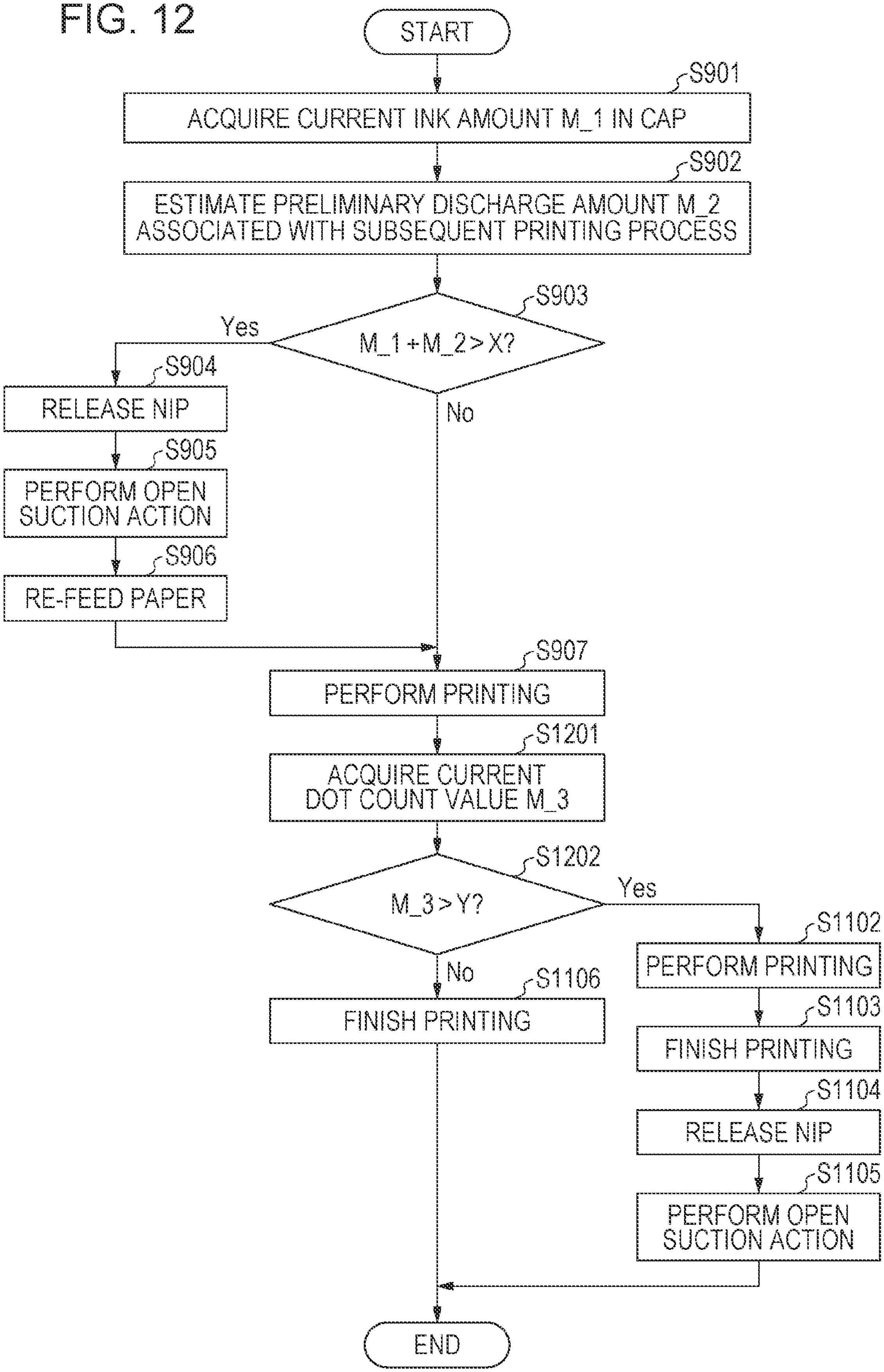
FIG. 12 is a flowchart of the process of determining whether to perform an open suction action on the basis of a dot count value during printing according to the second embodiment.

According to the present embodiment, even in the determination using the threshold value Y, the preliminary discharge amount associated with the subsequent printing process is estimated by calculation. However, determination of whether an open suction action is performed after end of printing may be made by comparing a dot count value during printing and the threshold value Y. FIG. 12 illustrates a flow for determining whether an open suction action is performed on the basis of the dot count value during printing. In FIG. 12, the processing up to step S907 for performing a printing operation is the same as the flow illustrated in FIG. 11, and even after starting the printing operation, a current dot count value M_3 discharged into the cap is counted (step S1201). This counting process is performed when performing an intra-printing preliminary discharge between scans. Each time the dot count value M_3 is updated, it is determined whether the dot count value M_3 is greater than the threshold value Y in step S1202. If the dot count value M_3 is greater than the threshold value Y before the printing operation is finished, an open suction action and the related operations (steps S1102 to S1105) are performed as in the flow illustrated in FIG. 11. As illustrated in FIG. 12, by comparing the measured value of actually discharged ink amount with the threshold value Y, the number of situations where it is determined that an open suction action is required can be reduced as compared with the estimation before printing under the assumption that the preliminary discharge amount may be maximized.

Third Embodiment

The third embodiment is described below. The conveyance drive transmission system and the configuration of the recovery mechanism according to the present embodiment are the same as those according to the first and second embodiments described above.

Figure 13:
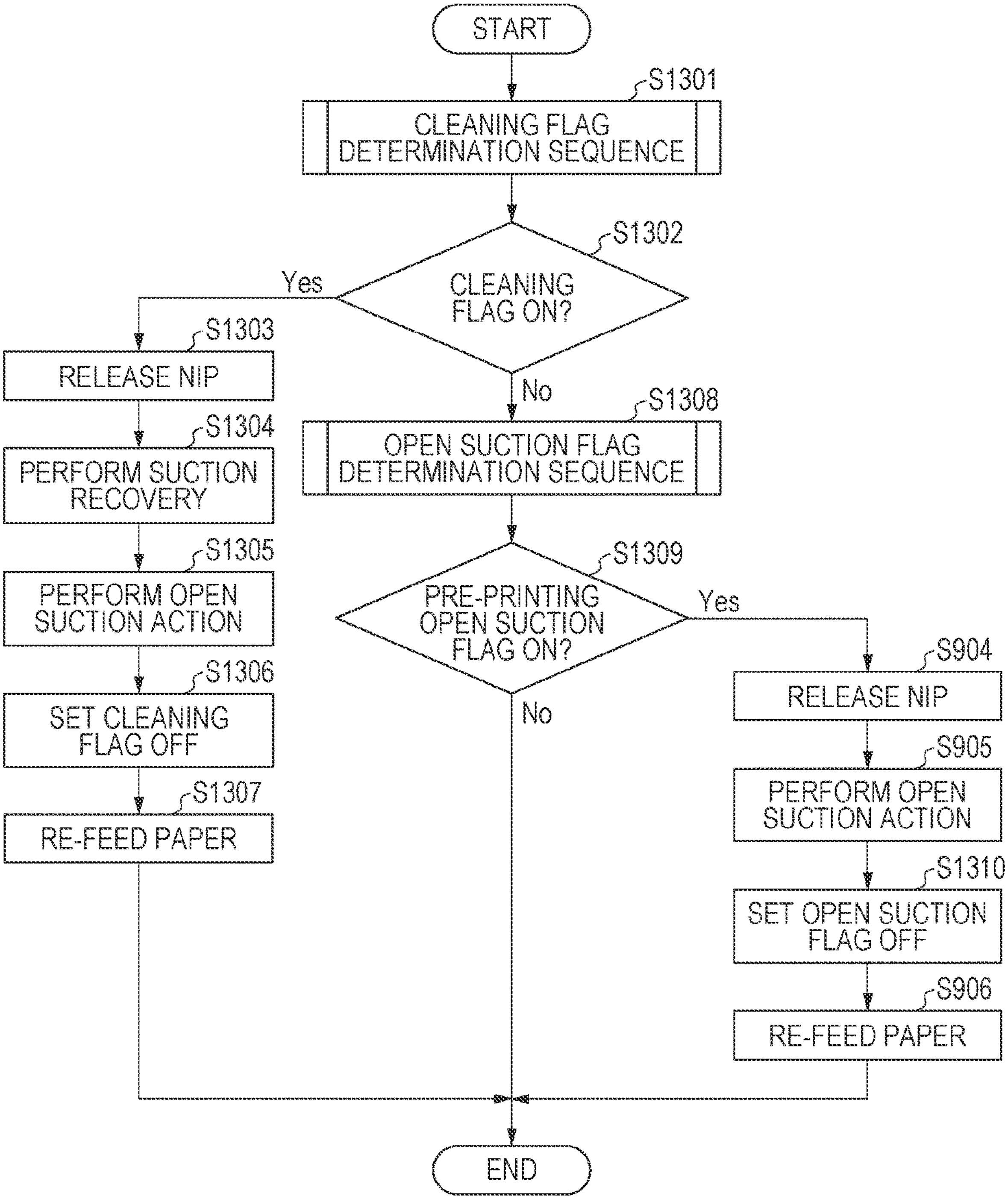
FIG. 13 is a flowchart of a printing operation according to a third embodiment.

FIG. 13 is a flowchart of a printing operation according to the present embodiment. The processing in FIG. 13 starts after a print command is received and the paper feeding operation is finished. In step S1301, a cleaning flag determination sequence is executed. This sequence is executed to perform cleaning of a type with a high priority on the basis of a plurality of determination results, such as the elapsed time since the most recent cleaning operation. This process is described in more detail below. In step S1302, it is determined whether any one of cleaning flags is ON as a result of the determination made in step S1301.

If, in step S1302, any one of the cleaning flags is ON, the processing proceeds to step S1303, where the print medium is rewound to a predetermined position and, thereafter, the nipping by the pinch roller is released. In step S1304, a desired suction recovery operation is performed. After the suction recovery operation is performed, an open suction action is performed in step S1305, and the cleaning flag is set OFF in step S1306. Thereafter, the print medium is fed in step S1307, and the processing is completed.

If in step S1302, the cleaning flag is not ON, the processing proceeds to an open suction flag determination sequence in step S1308. This is the sequence for determining whether an open suction action needs to be performed in the similar manner to the first and second embodiments described above. The sequence is described in more detail below. In step S1309, it is determined whether a pre-printing open suction flag is determined to be ON in the open suction flag determination sequence of step S1308. If it is determined to be ON, the nipping of the print medium is released in step S904, and an open suction action is performed in step S905, as in the case of performing the open suction action before printing in the first embodiment. After the open suction action is performed, the open suction flag is changed to OFF. In step S906, a feeding operation for feeding the print medium is performed again, and the processing is completed. If in step S1309, it is determined that the pre-printing open suction flag is OFF, the processing is completed.

Figure 14:
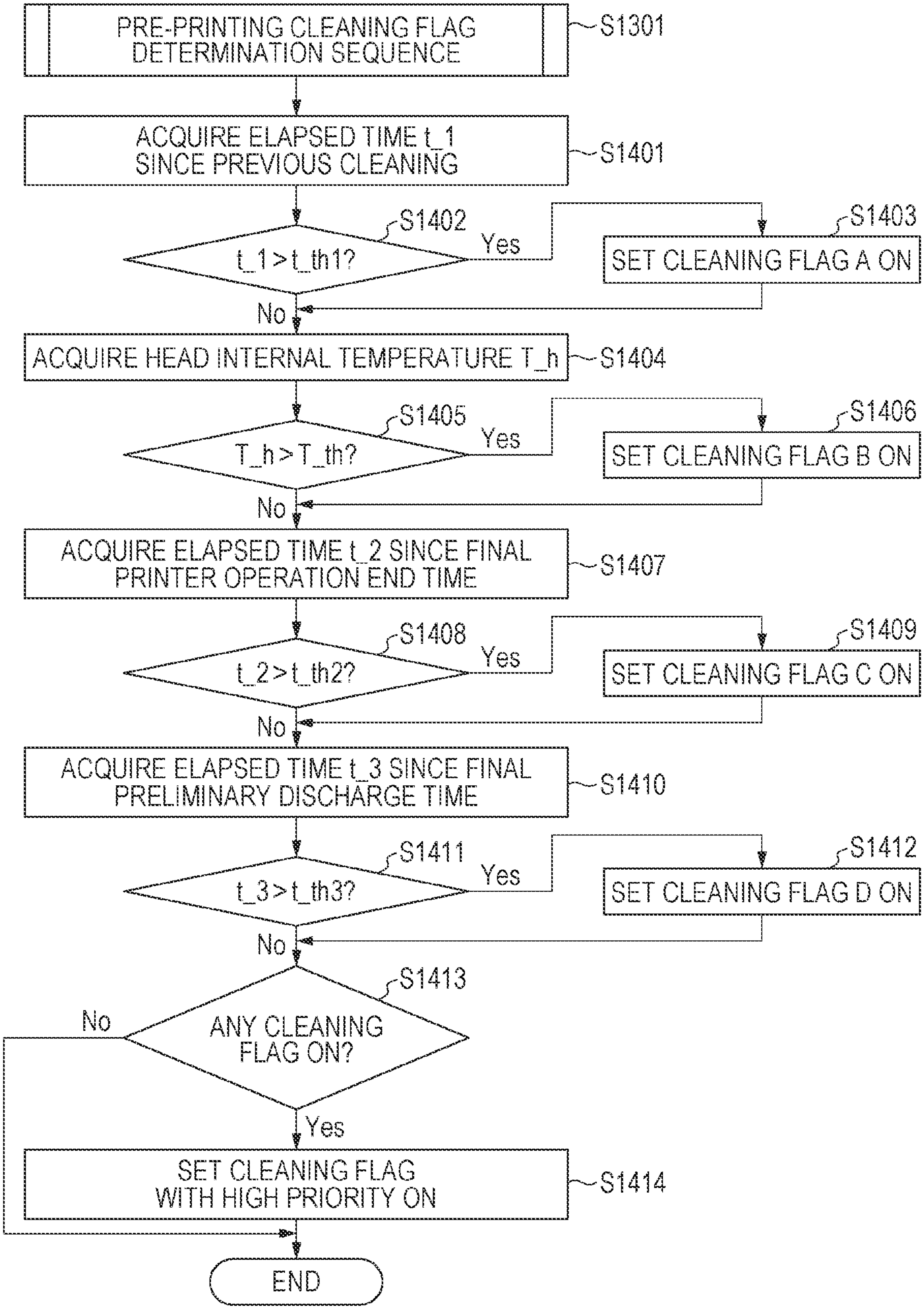
FIG. 14 is a flowchart of the control performed by the printing apparatus to determine a pre-printing cleaning flag status according to a third embodiment.

FIG. 14 illustrates the detailed sequence for determining the statuses of the cleaning flags in step S1301. In step S1401, an elapsed time t_1 since the most recent cleaning operation is acquired. In step S1402, it is determined whether the elapsed time t_1 since the most recent cleaning operation is greater than the threshold value t_th1. If it is determined that the elapsed time t_1 is greater than the threshold value Uh1, a cleaning flag A is set ON in step S1403, and the processing proceeds to step S1404. If in step S1402, it is determined that the elapsed time t_1 is not greater than the threshold value Uh1, the processing proceeds to step S1404, where a head internal temperature T_h is acquired.

In step S1405, it is determined whether the head internal temperature T_h is higher than a threshold value T_th. If it is determined that the head internal temperature T_h is higher than the threshold value T_th, a cleaning flag B is updated to ON in step S1406. Thereafter, the processing proceeds to step S1407. If in step S1405, it is determined that the head internal temperature T_h is not higher than the threshold value T_th, the processing proceeds to step S1407, where an elapsed time t_2 since the final printer operation end time is acquired.

In step S1408, it is determined whether the elapsed time t_2 is greater than a threshold value t_th2. If the elapsed time t_2 is greater than a threshold value t_th2, a cleaning flag C is updated to ON in step S1409, and the processing proceeds to step S1410. If the elapsed time t_2 is not greater than the threshold value t_th2, the processing proceeds to step S1410, where an elapsed time t_3 since the final preliminary discharge time is acquired.

In step S1411, it is determined whether the elapsed time t_3 is greater than a threshold value t_th3. If the elapsed time t_3 is greater than the threshold value t_th3, a cleaning flag D is updated to ON in step S1412, and the processing proceeds to step S1413. If the elapsed time t_3 is not greater than the threshold value t_th3, the processing proceeds to step S1413, where it is determined whether there is any cleaning flag that is ON. If at least one of the cleaning flags is ON, the processing proceeds to step S1414, where the table in FIG. 19 is referred to, and a cleaning operation with a high priority is selected from among cleaning operations having the cleaning flags that are ON. The cleaning flag of the selected cleaning operation is updated to ON, and the processing is completed. If in step S1413, there is no cleaning flag set to ON, the processing is immediately completed.

Figure 15:
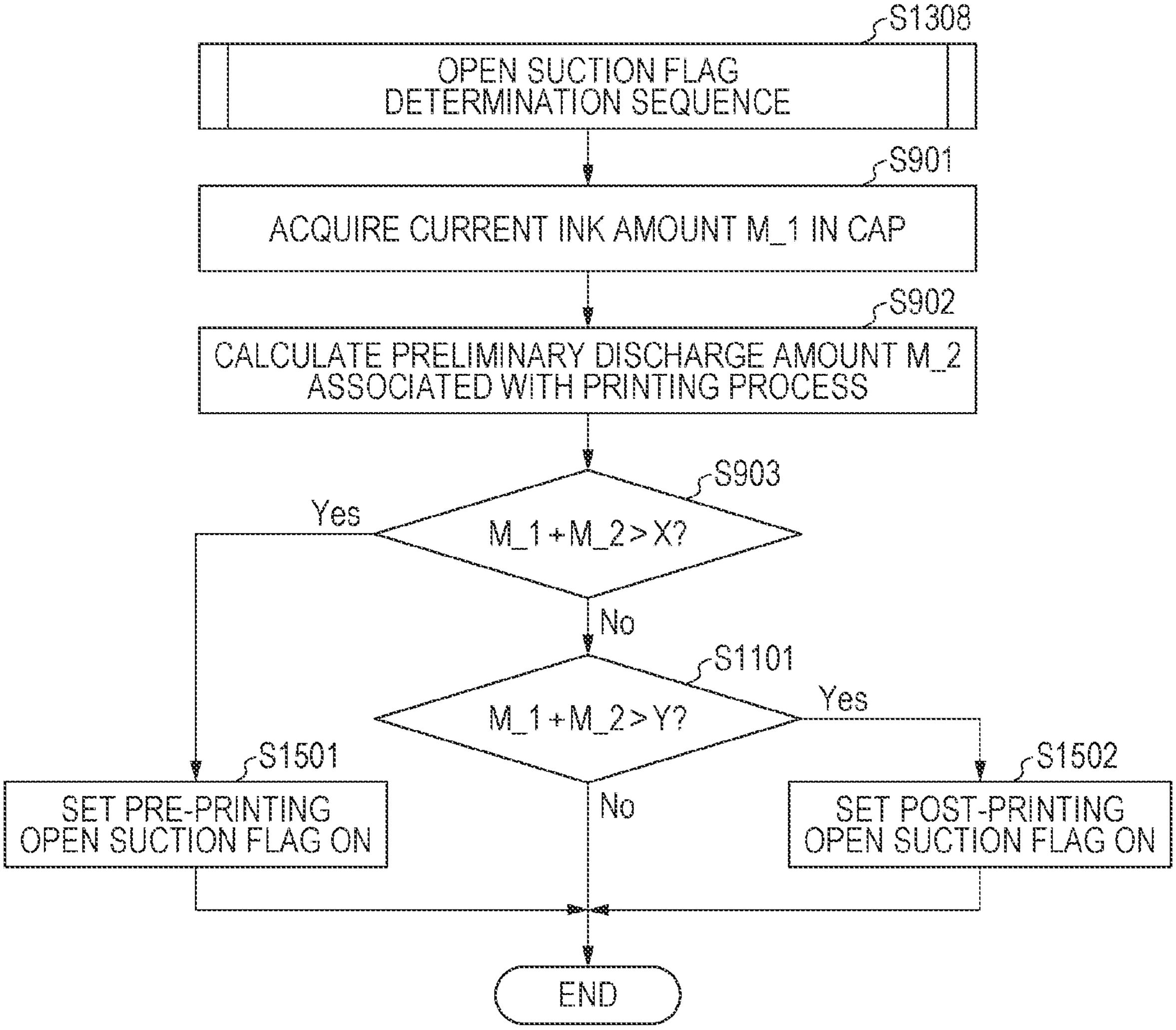
FIG. 15 is a flowchart of the control performed by the printing apparatus to determine an open suction flag status according to the third embodiment.

FIG. 15 illustrates the details of the sequence for determining the status of the open suction flag in step S1308. The processing illustrated in FIG. 15 is basically the same as the processing in the sequence illustrated in FIG. 11 according to the second embodiment. However, if in step S903, M_1+

M_2 is greater than the threshold value X, the pre-printing open suction flag is set ON in step S1501, and the processing is completed. If in step S903, M_1+M_2 is not greater than the threshold value X, the processing proceeds to step S1101, where it is determined whether M_1+M_2 is greater than the threshold value Y. If it is determined that M_1+M_2 is greater than the threshold value Y, the processing proceeds to step S1502, where a post-printing open suction flag is updated to ON, and the processing is completed. If in step S1101, it is determined that M_1+M_2 is not greater than the threshold value Y, the processing is immediately completed.

Figure 17:
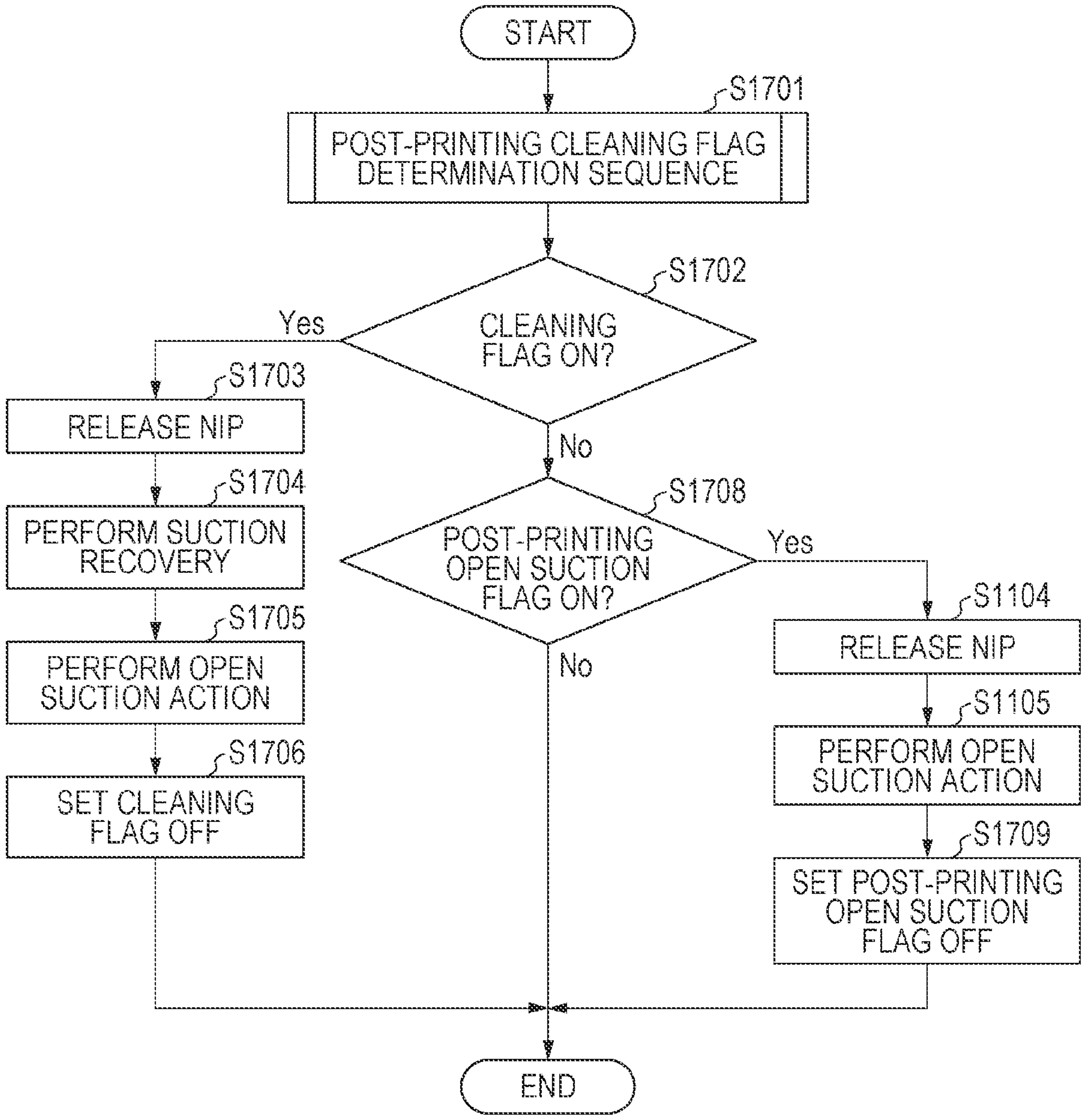
FIG. 17 is a flowchart of the operation performed by the printing apparatus after the end of printing according to the third embodiment.

FIG. 17 is a flowchart of the operation performed by the printing apparatus after the end of printing. The processing illustrated in FIG. 17 is started at the end of printing. In step S1701, a post-printing cleaning flag determination sequence is executed. The sequence is described in detail below with reference to the accompanying drawings. Subsequently, in step S1702, it is determined whether any one of cleaning flags is ON as a result of the determination in step S1701. If at least one of the cleaning flags is ON, a print medium is rewound to a predetermined position, and the nipping by the pinch roller is released in step S1703. In step S1704, a suction recovery operation is performed. After the suction recovery operation is performed, an open suction action is performed in step S1705. In step S1706, the cleaning flag is updated to OFF, and the processing is completed. If in step S1702, the cleaning flag is not ON, it is determined in step S1708 whether the post-printing open suction flag is ON. If it is determined that the post-printing open suction flag is ON, nipping of the print medium is released in step S1104, and an open suction action is performed in step S1105, as in the case of performing an open suction action after printing in the first embodiment. After the open suction action is performed, the post-printing open suction flag is updated to OFF in step S1709, and the processing is completed. If in step S1708, it is determined that the post-printing open suction flag is OFF, the processing is immediately completed.

Figure 18:
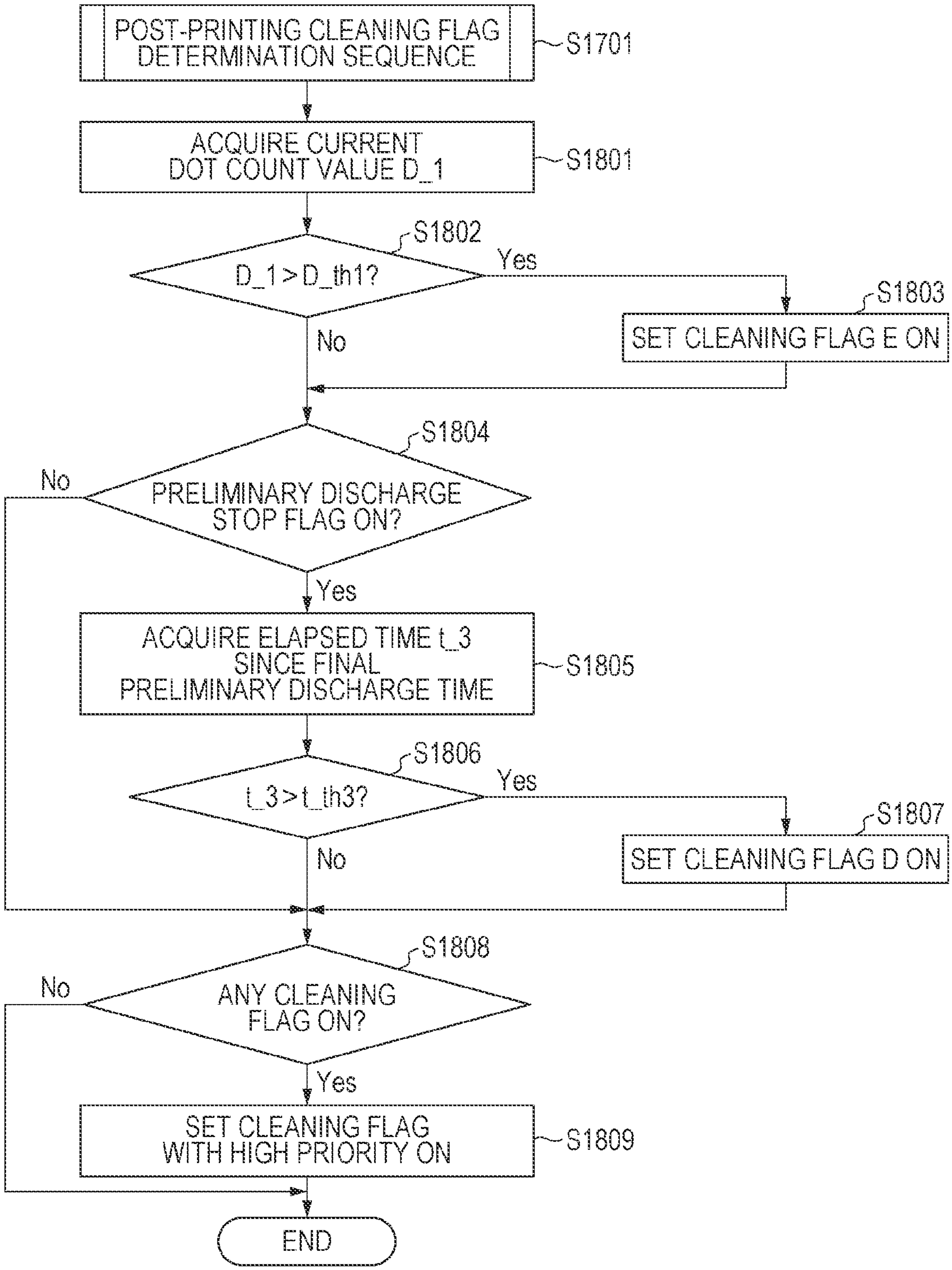
FIG. 18 is a flowchart of the control performed by the printing apparatus to determine a post-printing cleaning flag status according to the third embodiment.

FIG. 18 is a flowchart of the details of the sequence for determining the status of the post-printing cleaning flag in step S1701 in FIG. 17. The present embodiment provides the function of counting and storing the number of ink droplets discharged from the print head 717 during a printing operation (hereinafter, the function is referred to as a "dot count function"). In step S1801, a current dot count value D_1 is acquired using the dot count function. In step S1802, it is determined whether the current dot count value D_1 is greater than a threshold value D_th1. If the current dot count value D_1 is greater than the threshold value D_th1, a cleaning flag E is set ON in step S1803, and the processing proceeds to step S1804. If the current dot count value D_1 is not greater than the threshold value D_th1, the processing proceeds to step S1804, where it is determined whether a preliminary discharge stop flag is ON. The present embodiment provides a function of stopping preliminary discharge into the cap to prevent spillover of ink from the cap due to the preliminary discharge if the amount of ink in the cap is greater than a predetermined threshold value. When the preliminary discharge is stopped due to this function, the preliminary discharge stop flag is set ON.

If the preliminary discharge stop flag is not ON, the processing proceeds to step S1808. If the preliminary discharge stop flag is ON, the processing proceeds to step S1805, where the elapsed time t_3 since the final preliminary discharge time is acquired. In step S1806, it is determined whether the elapsed time t_3 is greater than a threshold value t_th3. If it is determined that the elapsed time t_3 is greater than the threshold value t_th3, the cleaning flag D is set ON in step S1807, and the processing proceeds to step S1808. In step S1808, it is determined whether there is any cleaning flag that is set ON through the above-described determination. If any one of the cleaning flags is ON, the processing proceeds to step S1809, where the table in FIG. 19 is referred to, and the cleaning flag with the high priority is selected and is set ON. Thereafter, the processing is completed. If in step S1808, it is determined that there is no cleaning flag that is ON, the processing is completed.

As described above, before determining the necessity of execution of the open suction action, it is determined whether the cleaning operation is to be performed due to different factors. As a result, the necessity of the open suction action can be determined with high accuracy, and the printing operation can be performed with reduced downtime.

According to the present embodiment, four cleaning flag determination conditions before printing and two cleaning flag determination conditions after printing are employed. However, at least one condition can be set before or after printing.

Fourth Embodiment

The conveyance drive transmission system and the configuration of the recovery mechanism according to the present embodiment are the same as those according to the first and second embodiments.

The present embodiment provides a function of counting and storing the amount of ink discharged from the print head during printing (hereinafter referred to as dot count function). If a count value obtained using the dot count function is greater than a certain threshold value, wiping is performed after a page is printed (this process is referred to as "dot count wiping"). In the process, to prevent image quality degradation due to the occurrence of disorder or defect of ink discharge caused by a fine ink droplet deposited and accumulated near the nozzle of the print head, a nozzle surface is wiped once and a deposited ink amount is reset if the count value is greater than or equal to the certain threshold value.

Figure 20:
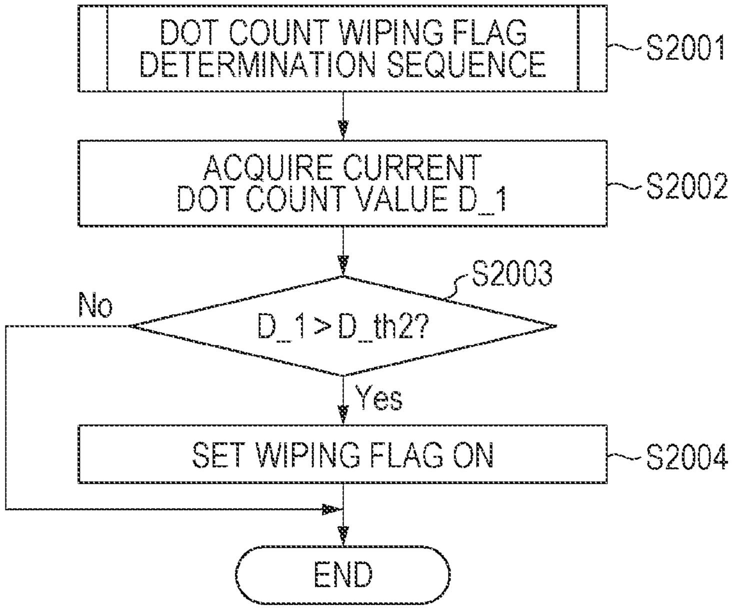
FIG. 20 is a flowchart of the control performed by a printing apparatus to determine a dot count wiping flag status according to a fourth embodiment.

FIG. 20 is a flowchart for determining the statuses of flags used to perform the dot count wiping. After page printing is finished, a dot count wiping flag determination sequence is started in step S2001. In step S2002, the current dot count value is acquired. In step S2003, it is determined whether the count value is greater than a threshold value D_th2. If in step S2003, it is determined that the count value is not greater than the threshold value D_th2, the sequence is completed. If in step S2003, it is determined that the count value is greater than the threshold value D_th2, the processing proceeds to step S2004, where the wiping flag is updated to ON and, thereafter, the sequence is completed.

Figure 22:
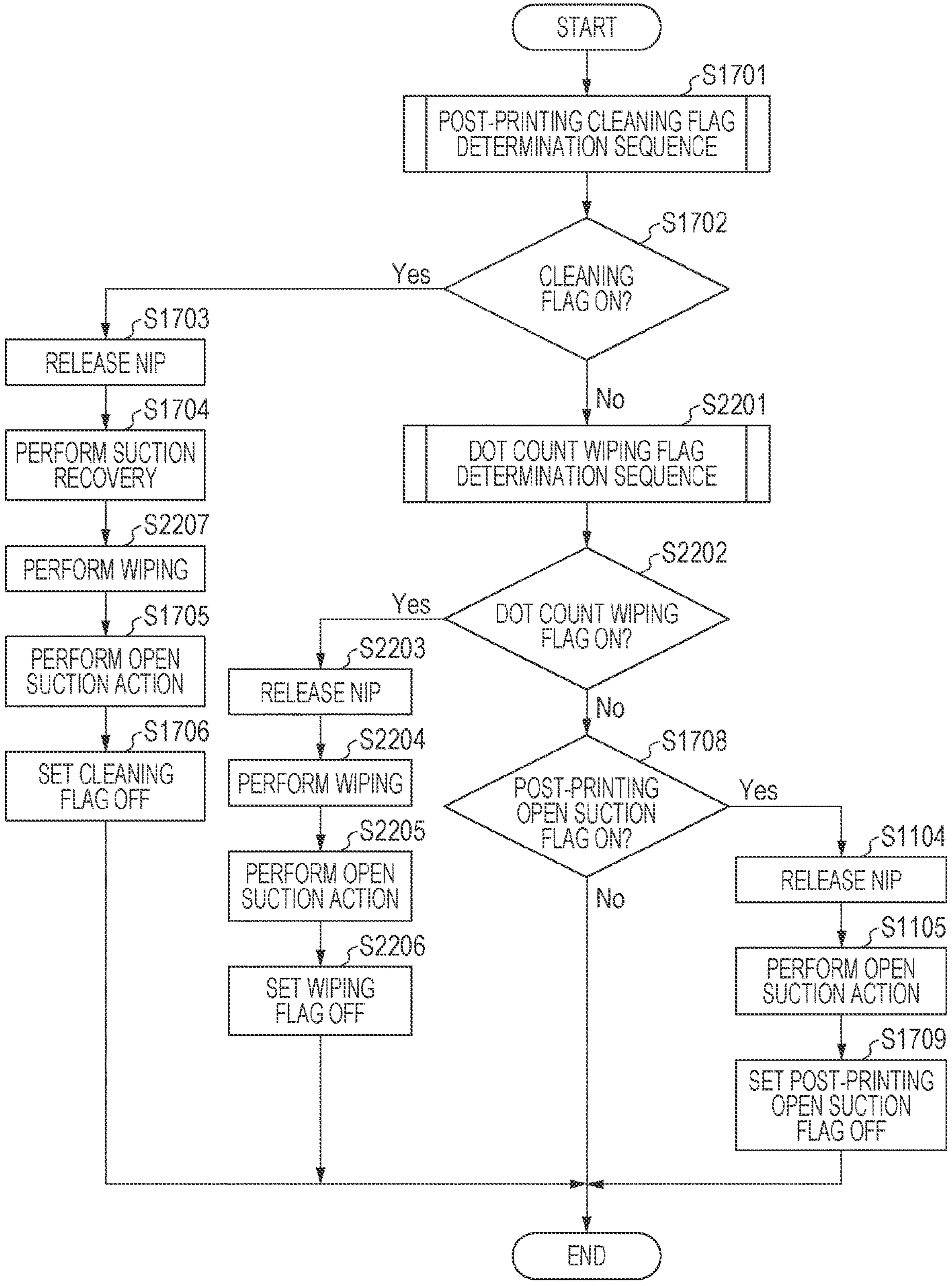
FIG. 22 is a flowchart of the control performed by the printing apparatus to determine a post-printing cleaning flag status according to the fourth embodiment.

FIG. 22 is a flowchart of the entire suction recovery operation after printing as in the third embodiment. The operation includes the dot count wiping flag determination sequence illustrated in FIG. 20. In step S1701, a post-printing cleaning flag determination sequence is started. The operation performed when it is determined in step S1702 that the cleaning flag is ON is the same as in the third embodiment, except that wiping is performed in step S2207 after suction recovery is performed in step S1704. If in step S1702, it is determined that the cleaning flag is not ON, the dot count wiping flag determination sequence is performed in step S2201, as illustrated in FIG. 20. In step S2202, it is determined whether the dot count wiping flag is ON. If it is determined that the dot count wiping flag is ON, the processing proceeds to step S2203, where the conveyance roller 10 is reversed to rewind the roll paper 802 that is nipped by the pinch roller 805 so that the leading edge of the print medium is moved past the sensor 804, and the nipping of the roll paper 802 by the pinch roller 805 is released. In step S2204, nozzle wiping is performed and, thereafter, an open suction action is performed regardless of the amount of ink in the cap in step S2205. In step S2206, the wiping flag is set OFF, and the processing is completed. If in step S2202, it is determined that the wiping flag is not ON, the processing proceeds to step S1708, where the processing relating to the post-printing open suction flag is performed as in the third embodiment, and the sequence is completed.

Figure 21:
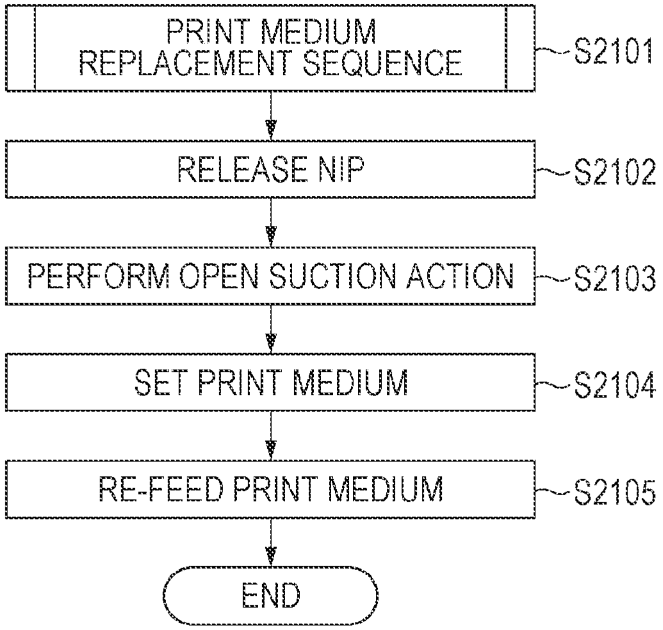
FIG. 21 is a flowchart of the control performed by a printing apparatus at the time of print medium replacement according to the fourth embodiment.

The nip release operation described above is also necessary when a mode in which roll paper is used as a print medium to be fed is changed to a mode in which cut sheets are used. FIG. 21 is a flowchart of a print medium replacement operation. In step S2101, a print medium replacement sequence is started. In step S2102, the conveyance roller 10 is reversed to rewind the roll paper 802 that is nipped by the pinch roller 805 so that the leading edge of the print medium is moved past the sensor 804. Thereafter, the nipping of the roll paper 802 by the pinch roller 805 is released. In step S2103, an open suction action is performed regardless of the amount of ink in the cap. In step S2104, it is detected that a print medium is set on the cut sheet tray 809 by the user. In step S2105, a paper feeding operation is started, and the sequence is completed.

As described above, when the print medium nip release operation is required due to a factor different from that in the open suction action execution determination sequence according to the first to third embodiments, the preliminary discharge amount in the cap is not estimated, and the open suction action is performed. As a result, the number of situations where an unnecessary open suction action is performed after reception of a print command is reduced, and a printing operation with reduced downtime can be performed.

OTHER EMBODIMENTS

To achieve one or more functions of the printing apparatus or the host apparatus according to the above-described embodiments, the control unit 72 or a computer of the host apparatus may execute a program. For example, the program may be provided to the printing apparatus or the host apparatus via a network or a variety of storage media, and a computer (for example, a central processing unit (CPU), a micro processing unit (MPU), or the like) provided therein may read the program and perform the function. Alternatively, various elements may be caused to execute the programs. In addition, the program may be executed by a single computer or a plurality of computers that cooperate with one another.

In addition, it is not necessary to implement all of the processes described in in the above flowcharts by software, and a subset or all of the processes may be implemented by hardware, such as an application specific integrated circuit (ASIC). Furthermore, the configuration is not limited to a configuration in which one CPU performs all the processes. A plurality of CPUs may perform the processes while appropriately cooperating with one another. Alternatively, a configuration may be employed in which one CPU performs any one of the processes, and a plurality of CPUs perform the other processes while cooperating with one another.

According to the present disclosure, determination of whether to perform an open suction action can be made while preventing spillover of ink from the cap.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an ASIC or the like) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., a central processing unit (CPU), a micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-192444 filed Nov. 26, 2021, which is hereby incorporated by reference herein in its entirety.

What is claimed is:

1. An inkjet printing apparatus comprising:

a print head including a plurality of nozzles, each discharging ink;

a conveyance unit configured to convey a print medium relative to the print head;

a cap configured to receive the ink discharged from the print head during preliminary discharge;

an acquisition unit configured to acquire a post-printing ink amount when a print command is input for a print medium, the post-printing ink amount being an amount of ink in the cap at a time of end of printing that is initiated by the print command; and a discharge unit configured to perform a discharge operation to discharge the ink in the cap before start of the printing initiated by the print command if the post-printing ink amount acquired by the acquisition unit is greater than a threshold value, wherein the acquisition unit acquires an intra-printing preliminary discharge amount due to preliminary discharge performed during printing based on, among the plurality of nozzles, a number of nozzles used during the printing initiated by the print command.

2. The inkjet printing apparatus according to claim 1, wherein the preliminary discharge performed during printing is initiated by the print command and the acquisition unit acquires the post-printing ink amount based on the intra-printing preliminary discharge amount.

3. The inkjet printing apparatus according to claim 2, wherein the printing initiated by the print command is printing of a serial type in which the print head scans over the print medium, and wherein the acquisition unit acquires the intra-printing preliminary discharge amount based on information indicating a number of scans performed by the print head for a predetermined unit area during the printing initiated by the print command.

4. The inkjet printing apparatus according to claim 2, wherein the printing initiated by the print command is printing of a serial type in which the print head scans over the print medium, and wherein the intra-printing preliminary discharge is performed between the time of end of a scan of the print head and the time of beginning of a next scan during the printing initiated by the print command.

5. The inkjet printing apparatus according to claim 1, wherein the acquisition unit acquires a pre-printing preliminary discharge amount due to preliminary discharge performed before printing initiated by the print command and acquires the post-printing ink amount based on the pre-printing preliminary discharge amount.

6. The inkjet printing apparatus according to claim 5, wherein the acquisition unit acquires the pre-printing preliminary discharge amount based on a number of nozzles used during the printing initiated by the print command.

7. The inkjet printing apparatus according to claim 1, wherein the acquisition unit acquires an intra-standby preliminary discharge amount due to preliminary discharge performed during a predetermined standby time period after the printing initiated by the print command and acquires the post-printing ink amount based on the intra-standby preliminary discharge amount.

8. The inkjet printing apparatus according to claim 1, wherein the acquisition unit acquires an amount of ink in the cap at a time of the input of the print command and acquires the post-printing ink amount based on the amount of ink.

9. The inkjet printing apparatus according to claim 1, wherein the conveyance unit and the discharge unit are driven by a common drive source.

10. The inkjet printing apparatus according to claim 1, wherein the discharge unit includes a pump configured to perform the discharge operation by generating negative pressure.

11. The inkjet printing apparatus according to claim 10, wherein the discharge unit performs the discharge operation by driving the pump with the print head not in contact with the cap.

12. The inkjet printing apparatus according to claim 1, wherein the print head includes a first nozzle row and a second nozzle row, and wherein the inkjet printing apparatus comprises a first cap configured to receive ink discharged from the first nozzle row and a second cap configured to receive ink discharged from the second nozzle row.

13. The inkjet printing apparatus according to claim 12, wherein the acquisition unit acquires the post-printing ink amount for each of the first cap and the second cap.

14. A method for controlling an inkjet printing apparatus, the inkjet printing apparatus including a print head including a plurality of nozzles, each discharging ink, a conveyance unit configured to convey a print medium relative to the print head, a cap configured to receive the ink discharged from the print head during preliminary discharge, and a discharge unit configured to perform a discharge operation to discharge the ink in the cap, the method comprising:

acquiring a post-printing ink amount when a print command is input for a print medium, the post-printing ink amount being an amount of ink in the cap at a time of end of printing that is initiated by the print command; and performing the discharge operation using the discharge unit before start of the printing initiated by the print command if the acquired post-printing ink amount is greater than a threshold value, wherein the acquiring acquires an intra-printing preliminary discharge amount due to preliminary discharge performed during printing based on, among the plurality of nozzles, a number of nozzles used during the printing initiated by the print command.

15. A non-transitory computer-readable storage medium storing one or more programs including executable instructions that, when executed by a computer, causes the computer to perform a method for controlling an inkjet printing apparatus, the inkjet printing apparatus including a print head including a plurality of nozzles, each discharging ink, a conveyance unit configured to convey a print medium relative to the print head, a cap configured to receive the ink discharged from the print head during preliminary discharge, and a discharge unit configured to perform a discharge operation to discharge the ink in the cap, the method comprising:

acquiring a post-printing ink amount when a print command is input for a print medium, the post-printing ink amount being an amount of ink in the cap at a time of end of printing that is initiated by the print command; and performing the discharge operation using the discharge unit before start of the printing initiated by the print command if the acquired post-printing ink amount is greater than a threshold value, wherein the acquiring acquires an intra-printing preliminary discharge amount due to preliminary discharge performed during printing based on, among the plurality of nozzles, a number of nozzles used during the printing initiated by the print command.

* * * * *